US009709429B2

(12) United States Patent
Chatterjee et al.

(10) Patent No.: US 9,709,429 B2
(45) Date of Patent: Jul. 18, 2017

(54) MEMS BASED MEMBRANE SENSOR SYSTEM AND METHOD OF USE

(71) Applicant: General Electric Company, Schenectady, NY (US)

(72) Inventors: Aveek Chatterjee, Bangalore (IN); Arjun Bhattacharyya, Bangalore (IN); Shankar Chandrasekaran, Chennai (IN)

(73) Assignee: General Electric Company, Schenectady, NY (US)

( * ) Notice: Subject to any disclaimer, the term of this patent is extended or adjusted under 35 U.S.C. 154(b) by 1155 days.

(21) Appl. No.: 13/724,531

(22) Filed: Dec. 21, 2012

(65) Prior Publication Data

US 2014/0180610 A1     Jun. 26, 2014

(51) Int. Cl.
     *G01F 1/00*        (2006.01)
     *G01F 3/00*        (2006.01)
     (Continued)

(52) U.S. Cl.
     CPC .............. *G01F 3/00* (2013.01); *B01D 61/12* (2013.01); *B01D 63/106* (2013.01); *B01D 63/12* (2013.01); *C02F 1/008* (2013.01); *G01F 1/8436* (2013.01); *G06F 17/00* (2013.01); *B01D 2311/14* (2013.01); *B01D 2311/16* (2013.01); *B01D 2311/243* (2013.01); *B01D 2313/00* (2013.01);
     (Continued)

(58) Field of Classification Search
     CPC .......... G01F 1/8436; G01F 3/00; G06F 17/00; B01D 61/00
     USPC ........................................................ 702/45
     See application file for complete search history.

(56) References Cited

U.S. PATENT DOCUMENTS

| 4,682,113 A * | 7/1987 | Barben, II | ............. | G01N 27/06 |
| | | | | 204/406 |
| 7,343,136 B2 * | 3/2008 | Liu | .................... | G01M 5/0008 |
| | | | | 340/539.1 |

(Continued)

FOREIGN PATENT DOCUMENTS

| EP | 1844836 A2 | 10/2007 |
| EP | 2295134 A1 | 3/2011 |

OTHER PUBLICATIONS

PCT Search Report and Written Opinion issued in connection with corresponding Application No. PCT/US2013/072542 on Feb. 17, 2014.

(Continued)

*Primary Examiner* — Michael Nghiem
(74) *Attorney, Agent, or Firm* — Wegman, Hessler & Vanderburg

(57) ABSTRACT

A MEMS sensor system for monitoring membrane elements in a membrane based water filtration plant having a remote telemetry unit (RTU), a SCADA, and a plurality of MEMS sensors for measuring pressure, flow rate. and conductivity. The water filtration plant has a train with a membrane vessel containing a plurality of membrane elements arranged in series creating interfaces between each membrane element. The MEMS sensors are located at the membrane element interfaces. A method of monitoring membrane elements in a membrane based water filtration plant using a plurality of MEMS sensors for measuring pressure, flow rate. and conductivity placed at the filtration plant membrane element interfaces.

20 Claims, 21 Drawing Sheets

(51) Int. Cl.
*G06F 17/00* (2006.01)
*G01F 1/84* (2006.01)
*B01D 61/12* (2006.01)
*B01D 63/10* (2006.01)
*B01D 63/12* (2006.01)
*C02F 1/00* (2006.01)
*C02F 1/44* (2006.01)

(52) U.S. Cl.
CPC .... *B01D 2317/04* (2013.01); *B01D 2319/022* (2013.01); *C02F 1/441* (2013.01); *C02F 1/442* (2013.01); *C02F 2209/008* (2013.01); *C02F 2209/02* (2013.01); *C02F 2209/03* (2013.01); *C02F 2209/05* (2013.01); *C02F 2209/40* (2013.01)

(56) References Cited

U.S. PATENT DOCUMENTS

| | | | |
|---|---|---|---|
| 7,584,061 B2 * | 9/2009 | Wilf | B01D 61/025 702/34 |
| 7,603,898 B2 | 10/2009 | Speldrich | |
| 7,737,514 B1 * | 6/2010 | Fu | G01L 9/0073 257/418 |
| 2003/0130708 A1 * | 7/2003 | Von Arx | A61N 1/08 607/60 |
| 2004/0079686 A1 * | 4/2004 | Moscaritolo | B01D 29/603 210/90 |
| 2004/0138840 A1 | 7/2004 | Wolfe | |
| 2005/0109681 A1 * | 5/2005 | Moscaritolo | B01D 35/143 210/85 |
| 2008/0296208 A1 * | 12/2008 | Ikeyama | B01D 61/025 210/87 |
| 2009/0165569 A1 | 7/2009 | Taya et al. | |
| 2010/0051552 A1 | 3/2010 | Rohde et al. | |
| 2011/0079546 A1 * | 4/2011 | Konishi | B01D 61/025 210/87 |
| 2011/0240557 A1 | 10/2011 | Goodfellow | |
| 2014/0048462 A1 * | 2/2014 | Cohen | B01D 61/12 210/96.2 |
| 2015/0027890 A1 * | 1/2015 | Jha | B01J 39/05 204/520 |

OTHER PUBLICATIONS

Chen et al., "In situ monitoring techniques for concentration polarization and fouling phenomena in membrane filtration" Advances in Colloid and Interface Sciences, 107:83-108 (2004).
Paul et al., "Reverse Osmosis-Membrane Fouling—The Final Frontier" Ultra Pure Water 7:25-36 (1990).
Richardson et al., "Real-Time Membrane Fouling Monitoring—A Case History" Presented at and published by the WaterWorld's World of Water Conference, Las Vegas, Nevada, USA, Dec. 10-13, 2001. Re-printed in the Industrial WaterWorld's "Software Warns of Early MembraneFouling", Automation, vol. 03.01, p. 13, Jan./Feb. 2002, Penn Well.
Kujundzic et al., "Use of Ultrasonic Sensors for Characterization of Membrane Fouling and Cleaning" Journal of Engineered Fibers and Fabrics, Special Issue—Filtration (2008).

* cited by examiner

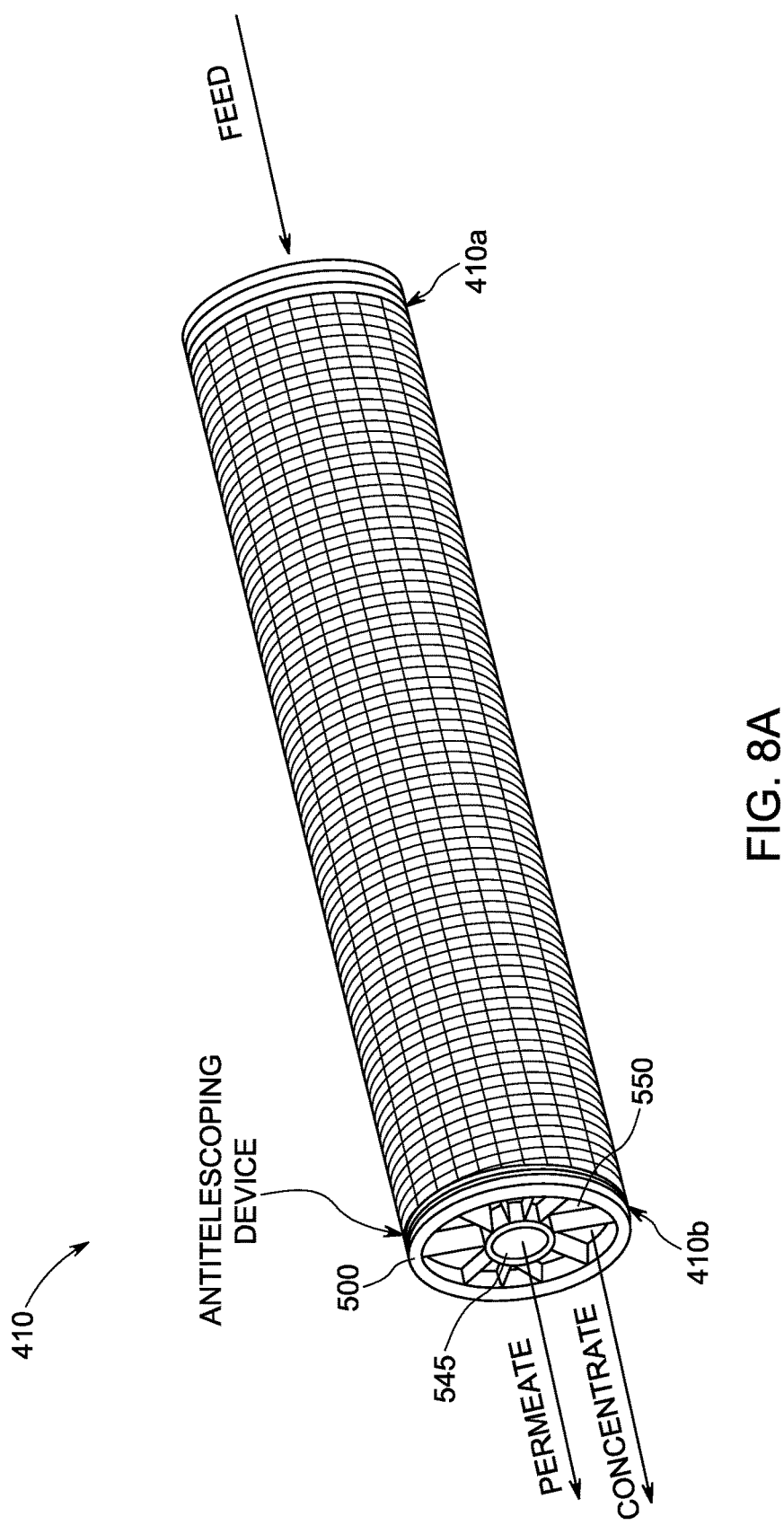

MEMS BASED MEMBRANE SENSOR SYSTEM AND METHOD OF USE

FIELD OF THE INVENTION

This invention pertains to MEMS (micro-electromechanical systems) based membrane element sensing and monitoring, more specifically MEMS based sensor, system, and method of monitoring reverse osmosis (RO) and nanofiltration (NF) membrane elements.

BACKGROUND OF THE INVENTION

The blockage or mechanical failure of a reverse osmosis (RO) or nanofiltration (NF) membrane element can lead to significant downtime of a membrane based water purification plant. There are several offline optical and acoustical devices and methods used to identify a membrane element mechanical failure or the amount of membrane element blockage. However, these devices and methods cannot provide online monitoring and are expensive and time consuming. Accordingly, there is a need for a membrane element mechanical failure and blockage sensor system to identify the presence of a mechanical failure and the presence and amount of blockage in a membrane element. Further, there is a need for a method of using the sensor system to help ensure timely cleaning and/or replacement of the mechanically failed and/or blocked membrane elements.

BRIEF SUMMARY OF THE INVENTION

In one aspect of the invention, a MEMS sensor system for a membrane based water filtration plant comprises: a remote telemetry unit (RTU), a SCADA, and a plurality of MEMS sensors for measuring pressure, flow rate, and conductivity of a stream; the water filtration plant is comprised of a train comprised of a membrane vessel containing a plurality of membrane elements; the membrane vessel and the membrane elements receive a feed stream and produce a concentrate stream and a permeate stream; the membrane elements are arranged in series creating interfaces between each adjacent membrane element; the MEMS sensors measure the flow rate, pressure, and conductivity of the feed stream, concentrate stream, and permeate stream at the membrane interfaces between each adjacent membrane element; the membrane vessel receives a feed stream and produces a permeate stream and a concentrate steam; the membrane vessel is further comprised of conventional pressure sensors, conventional conductivity sensors, and conventional flow sensors; the conventional pressure sensors are comprised of a conventional pressure sensor in each of the feed stream entering the membrane vessel, and concentrate stream and permeate stream exiting the membrane vessel; the conventional conductivity sensors are comprised of a conventional conductivity sensor in each of the feed stream entering the membrane vessel, and concentrate stream and permeate stream exiting the membrane vessel; the conventional flow sensors are comprised of a conventional flow sensor in each of the feed stream entering the membrane vessel, and concentrate stream and permeate stream exiting the membrane vessel; wherein the membrane vessel is further comprised of a conventional temperature sensor in the feed stream entering the membrane vessel; the conventional pressure sensors measure the pressure of the permeate, concentrate, and feed streams of the membrane vessel; the conventional conductivity sensors measure the conductivity of the permeate, concentrate, and feed streams of the membrane vessel; the conventional flow sensors measure the flow rate of the permeate, concentrate, and feed streams of the membrane vessel; the conventional temperature sensor measures the temperature of the feed stream of the membrane vessel; the RTU communicates with the MEMS sensors and the SCADA to provide the MEMS sensor pressure and conductivity measurements to the SCADA, the RTU communicates wirelessly with the MEMS sensors; the conventional pressure sensors, the conventional conductivity sensors, the conventional flow sensors, and the conventional temperature sensor provide measurements directly to the SCADA; wherein the SCADA uses measurements taken by the MEMS sensors, the conventional pressure sensors, the conventional conductivity sensors, the conventional flow sensors, and the conventional temperature sensor to identify membrane elements that are compromised.

In another aspect of the invention, the system identifies a compromised membrane element by calculating a normalized permeate flow rate, normalized differential pressure, and normalized salt passage for each membrane element using the MEMS sensor, the conventional pressure sensors, the conventional conductivity sensors, the conventional flow sensors, and the conventional temperature sensor, and comparing the calculated normalized permeate flow rate, the calculated normalized differential pressure, and the calculated normalized salt passage for each membrane element to a reference normalized permeate flow rate, a reference normalized differential pressure, and a reference normalized salt passage for each membrane element at reference conditions.

In another aspect of the invention, the system identifies compromised membrane vessels by calculating a normalized permeate flow rate, normalized differential pressure, and normalized salt passage for the membrane vessel using the conventional pressure sensors, the conventional conductivity sensors, the conventional flow sensors, and the conventional temperature sensor, and comparing the calculated normalized permeate flow rate, calculated normalized differential pressure, and calculated normalized salt passage for the membrane vessel to a reference normalized permeate flow rate, a reference normalized differential pressure, and a reference normalized salt passage for the membrane vessel at reference conditions.

In another aspect of the invention, the membrane element is identified as compromised when the calculated normalized permeate flow of the membrane element is at least about 5% less than the reference normalized permeate flow of the membrane element; wherein the membrane element is identified as compromised when the calculated normalized differential pressure of the membrane element is at least about 5% greater than the reference normalized pressure differential pressure of the membrane element; wherein the membrane element is identified as compromised when the calculated normalized salt passage of the membrane element is at least about 5 greater than the reference normalized salt passage of the membrane element; wherein the membrane vessel is identified as compromised when the calculated normalized permeate flow of the membrane vessel is at least about 5% less than the reference normalized permeate flow of the membrane vessel; wherein the membrane vessel is identified as compromised when the calculated normalized differential pressure of the membrane vessel is at least about 5% greater than the reference normalized pressure differential of the membrane vessel; wherein the membrane vessel is identified as compromised when the calculated normalized salt passage of the membrane vessel is at least about 5% greater than the reference normalized salt passage of the membrane vessel.

In another aspect of the invention, each of the MEMS sensors is comprised of at least one of a flow sensor, pressure sensor, or a conductivity sensor.

In another aspect of the invention, each of the MEMS sensors is comprised of a removable smart sensor structure (RSSS) and a control/data transceiver chip (CDTC); the RSSS is comprised of a smart part and at least one of a pressure sensor or a conductivity sensor; wherein the smart part is comprised of a coil, voltage regulator, inductive transceiver, non-volatile memory, microprocessor, and conversion circuitry; wherein the CDTC is comprised of a coil, inductive transceiver, and RF transceiver.

In another aspect of the invention, each of the MEMS sensor is powered by a battery in the CDTC, or wirelessly by the RTU.

In another aspect of the invention, each of the MEMS sensors employs one or both of smart power or smart monitoring.

In another aspect of the invention, each of the MEMS sensors contain housekeeping information.

In another aspect of the invention, each of the MEMS sensors are mounted to an anti-telescoping device (ATD) of the membrane elements, wherein the MEMS sensors are mounted in a press-fit slot or a fastener slot of the ATD.

In yet another aspect of the invention, a method of operating a MEMS sensor system for a membrane based water filtration plant comprises: providing a MEMS sensor system and a membrane train, the membrane train is comprised of a membrane vessel containing a plurality of membrane elements, the membrane elements are arranged in series to create membrane interfaces between each adjacent membrane element; the MEMS sensor system is comprised of a plurality of MEMS sensors and a SCADA; providing the membrane vessel with a feed stream, wherein the membrane vessel produces a concentrate stream and a permeate stream; the membrane vessel is further comprised of a conventional flow sensor, a conventional pressure sensor and a conventional conductivity sensor in each of the feed stream entering the membrane vessel, and concentrate stream and permeate stream exiting the membrane vessel; wherein the membrane vessel is further comprised of a conventional temperature sensor in the feed stream entering the membrane vessel; providing each of the membrane elements with a feed stream, wherein each of the membrane elements produce a concentrate stream and a permeate stream; the MEMS sensors are placed in the feed stream, concentrate stream, and permeate stream at the membrane interfaces; obtaining a reference normalized permeate flow rate, a reference normalized differential pressure, and a reference normalized salt passage for each of the membrane elements and membrane vessel; prompting the MEMS sensors and the conventional sensors to acquire flow rate, pressure, and conductivity measurements; prompting the conventional temperature sensor to acquire the temperature of the feed stream at time "t"; providing the flow rate, pressure, and conductivity measurements of the feed, permeate, and concentrate streams at the membrane interfaces and the membrane vessel at time "t" to the SCADA; providing the temperature of the feed stream of the membrane vessel at time "t" to the SCADA; calculating a normalized permeate flow rate, normalized differential pressure, and normalized salt passage for each membrane element and membrane vessel using the temperature, flow rate, pressure and conductivity measurements obtained at time "t"; and comparing the calculated normalized permeate flow rate, calculated normalized differential pressure, and calculated normalized salt passage of each membrane element and membrane vessel to the reference normalized permeate flow rate, reference normalized differential pressure, and reference normalized salt passage of each membrane element and membrane vessel to identify membrane elements and membrane vessels that are compromised.

In another aspect of the invention, the method further includes retrieving housekeeping information from the MEMS sensors and updating the housekeeping information.

In another aspect of the invention, the method further includes reporting to a user the normalized permeate flow rate, normalized differential pressure, and normalized salt passage of each membrane element and membrane vessel at time "t", the reference normalized permeate flow rate, reference normalized differential pressure, and reference normalized salt passage of each membrane element and membrane vessel, and the location of the compromised membrane elements and membrane vessels.

In another aspect of the invention, the membrane element is identified as compromised when the calculated normalized permeate flow rate of the membrane element is at least about 5% less than the reference normalized permeate flow rate of the membrane element; wherein the membrane element is identified as compromised when the calculated normalized differential pressure of the membrane element is at least about 5% greater than the reference normalized pressure differential pressure of the membrane element; wherein the membrane element is identified as compromised when the calculated normalized salt passage of the membrane element is at least about 5% greater than the reference normalized salt passage of the membrane element; wherein the membrane vessel is identified as compromised when the calculated normalized permeate flow rate of the membrane vessel is at least about 5% less than the reference normalized permeate flow rate of the membrane vessel; wherein the membrane vessel is identified as compromised when the calculated normalized differential pressure of the membrane vessel is at least about 5% greater than the reference normalized differential pressure of the membrane vessel; wherein the membrane vessel is identified as compromised when the calculated normalized salt passage of the membrane vessel is at least about 5% greater than the reference normalized salt passage of the membrane vessel.

In another aspect of the invention, the conductivity measurements are comprised of measurements of the concentration of individual dissolved analytes of interest and the total concentration of dissolved solids or TDS (total dissolved solids).

In another aspect of the invention, each of the MEMS sensors is comprised of at least one of a flow sensor, pressure sensor, or a conductivity sensor.

In another aspect of the invention, the MEMS sensor is comprised of a removable smart sensor structure (RSSS) and a control/data transceiver chip (CDTC); the RSSS is comprised of a smart part and at least one of a pressure sensor or a conductivity sensor; wherein the smart part is comprised of a coil, voltage regulator, inductive transceiver, non-volatile memory, microprocessor, and conversion circuitry; wherein the CDTC is comprised of a coil, inductive transceiver, and RF transceiver.

In another aspect of the invention, the MEMS sensor is powered by a battery in the CDTC.

In another aspect of the invention, a remote telemetry unit (RTU) communicates with the MEMS sensors and the SCADA to provide the MEMS sensor pressure and conductivity measurements to the SCADA, wherein the MEMS sensors are powered wirelessly by the RTU.

In another aspect of the invention, the MEMS sensors employ one or both of smart power or smart monitoring.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which:

FIGS. 8a-b is a membrane element in accordance with an embodiment of the current invention;

Figure 1A:
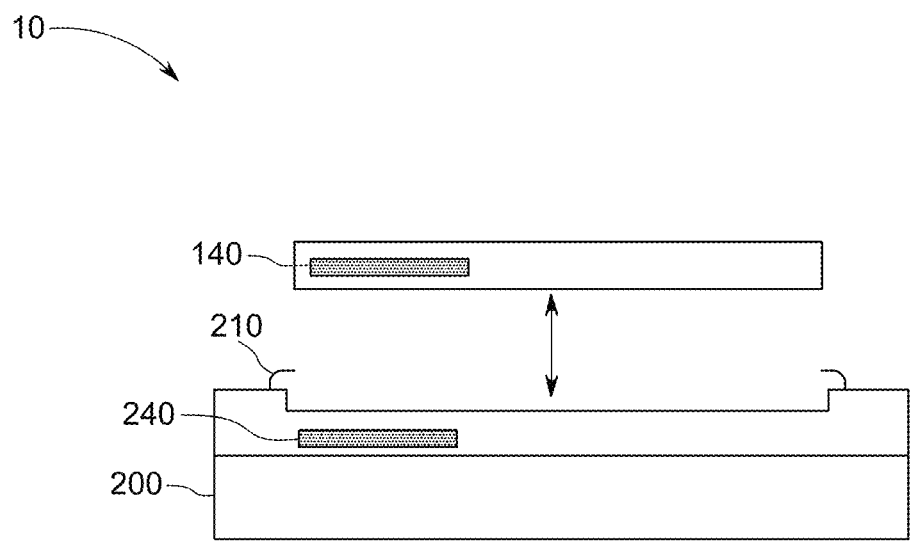
FIGS. 1a-c is a MEMS sensor in accordance with an embodiment of the current invention.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In at least some instances, the approximating language may correspond to the precision of an instrument for measuring the value. Range limitations may be combined and/or interchanged, and such ranges are identified and include all the sub-ranges stated herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

As used herein, the terms "comprises", "comprising", "includes", "including", "has", "having", or any other variation thereof, are intended to cover a non-exclusive inclusion. For example, a process, method, article or apparatus that comprises a list of elements is not necessarily limited to only those elements, but may include other elements not expressly listed or inherent to such process, method, article, or apparatus.

The singular forms "a", "an", and "the" include plural referents unless the context clearly dictates otherwise.

Figure 1B:
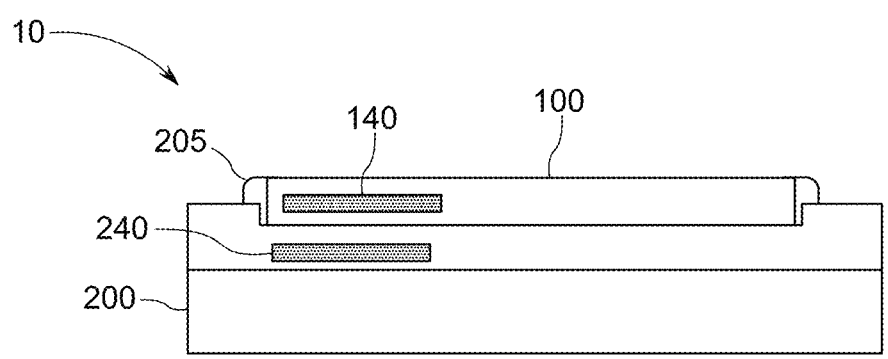

FIG. 1a-b discloses a MEMS sensor 10 for use in the online monitoring of an RO or NF membrane. A removable smart sensor structure (RSSS) 100 and a control/data transceiver chip (CDTC) 200 combine to form MEMS sensor 10. RSSS 100 and CDTC 200 each have a coil 140 and 240, which allows for power and communications to pass between RSSS 100 and CDTC 200. RSSS 100 and CDTC 200 communicate via serial inductive communication.

Structure handles 205 secure RSSS 100 to CDTC 200. If either RSSS 100 or CDTC 200 fail, this design allows for the RSSS 100 or CDTC 200 to be separated and the failed component, either RSSS 100 or CDTC 200, to be replaced with a working part. Further, the design also allows an operator to swap out an RSSS 100 having one sensor of a certain type or sensing range with an RSSS 100 having a sensor of a different type or sensing range. FIG. 1a shows RSSS 100 and CDTC 200 separated, meanwhile FIG. 1b shows RSSS 100 and CDTC 200 combined into a universal package.

Figure 1C:
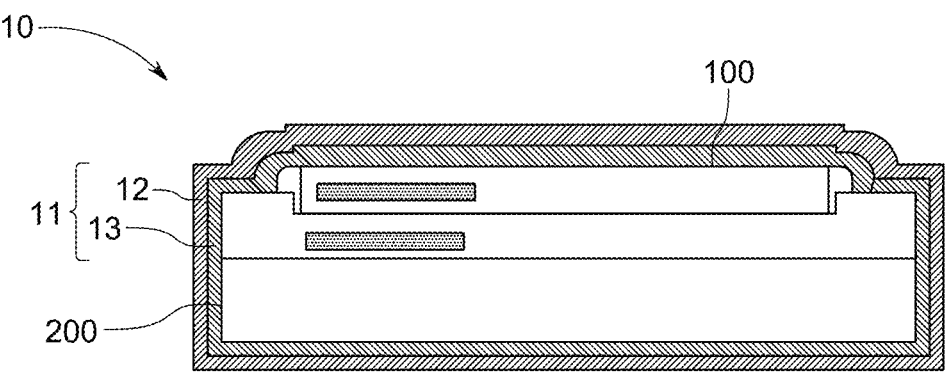

Turning to FIG. 1c, it is contemplated that MEMS sensor 10 is further comprised of a co-extruded multilayer structural membrane 11 having at least two polymeric sheets. In some embodiments of MEMS sensor 10, the co-extruded multilayer membrane 11 has a cap layer 12 adhered to one or more support layers 13. The cap layer 12 may be co-extruded through a first die and the support layers 13 may be co-extruded through a second die. The term co-extrusion refers to a manufacturing process in which two or more polymeric compounds are fed into a common extrusion die having a single discharge orifice. Polymeric compounds include, but are not limited to, Thermoplastic PolyOlefin, a polyolefin plastic, which includes, but is not limited to, propylene polymer.

Figure 2A:
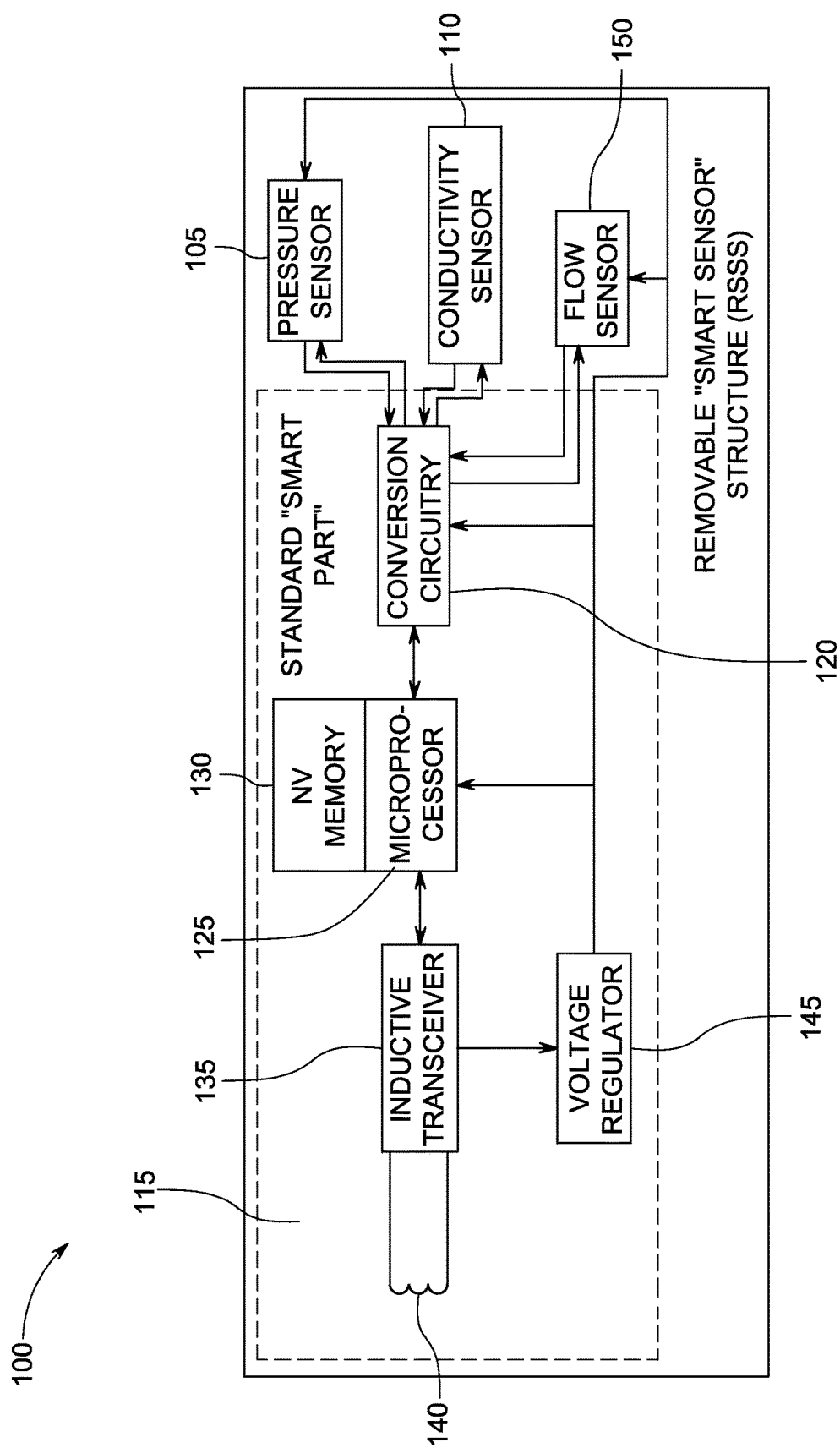
FIG. 2a is a block diagram of an RSSS in accordance with an embodiment of the current invention.

Turning to FIG. 2A, RSSS 100 is comprised of a smart part 115, pressure sensor 105, conductivity sensor 110, and flow sensor 150. It is contemplated that in some embodiments of MEMS sensor 10, pressure sensor 105, flow sensor 150, and conductivity sensor 110 are individually replaceable. This helps to reduce maintenance costs due to the fact that in the event of a failure of either pressure sensor 105, flow sensor 150, or conductivity sensor 110, only the individual failed sensor will need to be replaced, as opposed to the entire MEMS sensor 10.

Figure 3:
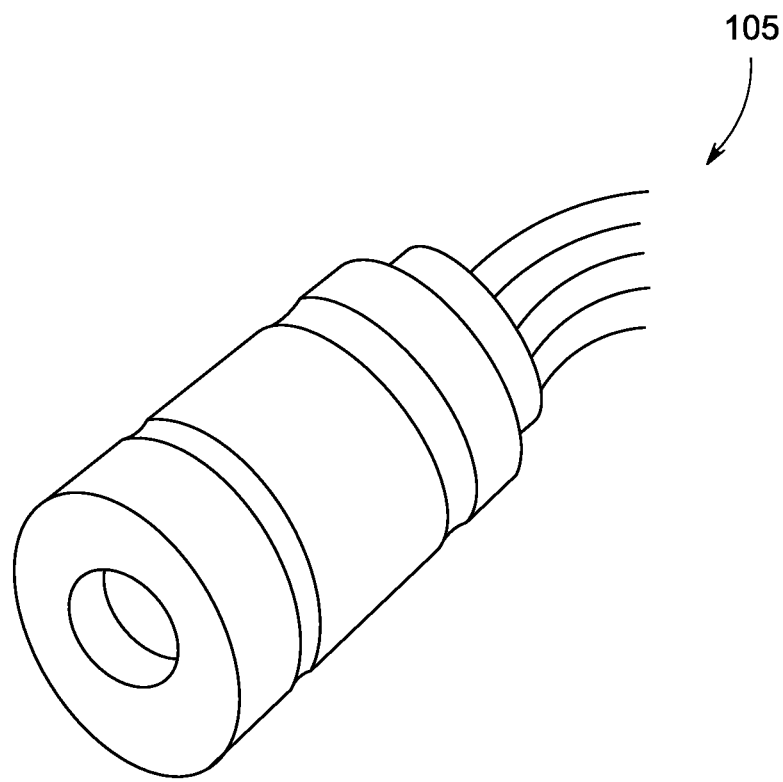
FIG. 3 is a pressure sensor in accordance with an embodiment of the current invention.

Pressure sensor 105, shown in FIG. 3, is tunable and in one embodiment has a pressure range of about 56-60 bar, which is suitable for seawater RO process. In another embodiment, pressure sensor 105 has a pressure range of about 10-15 bar, which is suitable for brackish water RO process. Further, it is contemplated that pressure sensor 105 is of a piezoresistive or resonant type.

Figure 4:
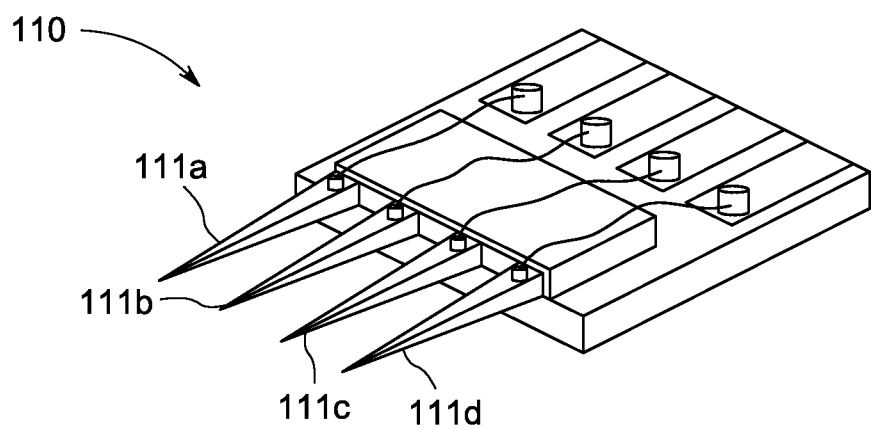
FIG. 4 is a conductivity sensor in accordance with an embodiment of the current invention.

One embodiment of conductivity sensor 110 is shown in FIG. 4. In this embodiment, conductivity sensor 110 has a plurality of electrodes 111a-d. Each electrode is gold plated and configured to measure the concentration of a different analyte (type of salt). Analytes include, but are not limited to, $CH_3C_2-$, $Cl-$, $NO_3-$, and $SO_4^2$. It is contemplated that in some embodiments, electrodes 111 are recessed into conductivity sensor 110. It is contemplated that conductivity sensor 110 may have more or less than four electrodes 111, one for each analyte of interest present in the fluid stream being measured. The term "analyte", in this document is defined as a dissolved analyte that is a part of total dissolved solids (TDS)

Flow sensor 150 can be any MEMS flow sensor suitable for measuring the flow rate of fluid in an RO membrane, including, but not limited to, the MEMS flow sensor described in U.S. Pat. No. 7,603,898.

Turning back to FIG. 2A, smart part 115 is comprised of conversion circuitry 120, non-volatile memory 130, microprocessor 125, inductive transceiver 135, voltage regulator 145, and coil 140.

Conversion circuitry 120 conditions and converts the outputs of pressure sensor 105, flow sensor 150, and conductivity sensor 110 into a form that is suitable for use by microprocessor 125. Depending upon the type and programming of microprocessor 125, conversion circuitry 120 may amplify, multiplex, and apply analog-to-digital conversion to the outputs of pressure sensor 105, flow sensor 150, and conductivity sensor 110. Microprocessor 125 uses non-volatile memory 130.

Further, microprocessor 125 ascertains the flow rate, pressure, and individual analyte concentrations, and total analyte concentration values for the location in the fluid stream where MEMS sensor 10 is situated through the outputs of pressure sensor 105, flow sensor 150, and conductivity sensor 110. Microprocessor 125 sends the flow rate, individual analyte concentrations, total analyte concentration (TDS), and pressure to CDTC 200 using serial communication via inductive transceiver 135 and coil 140.

Additionally, voltage regulator 145 receives voltage from CDTC 200 through inductive transceiver 135 and coil 140. Voltage regulator 145 provides voltage to pressure sensor 105, flow sensor 150, conductivity sensor 110, conversion circuitry 120, microprocessor 125, and non-volatile memory 130. Further, voltage regulator 145 provides power to CDTC 200 and its components, inductance transceiver 230 and RF transceiver 245, through inductive transceiver 135 and coil 140.

Further, non-volatile memory 130 can store housekeeping information such as the installation date of MEMS sensor 10, installation date of monitored membranes (upstream and downstream), owner of the monitored membranes, cleaning date of monitored membranes (upstream and downstream), cleaning chemical details for monitored membranes, including, but not limited to, the type and quantity of cleaning chemical used and duration of cleaning process, which are provided to MEMS sensor 10 by SCADA 460 for retrieval at a later time by SCADA 460.

It is understood that in some embodiments, the functions of conversion circuitry 120, non-volatile memory 130, and microprocessor 125 can be performed by a single unit, such as a microcontroller or ASIC. The operations taking place within microprocessor 125 are detailed in FIG. 6.

Figure 2B:
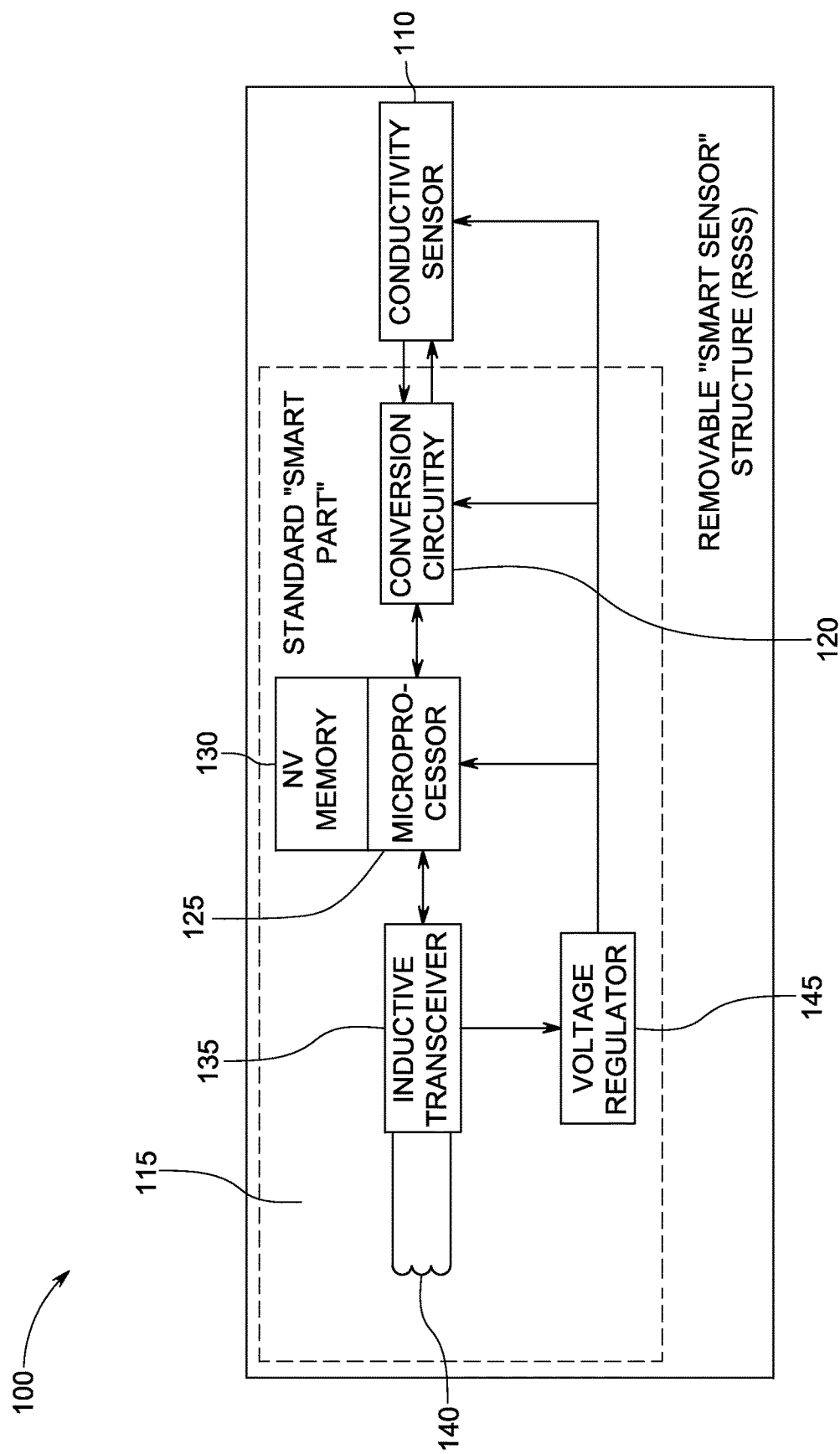
FIG. 2b is a block diagram of an RSSS in accordance with an embodiment of the current invention.
Figure 2C:
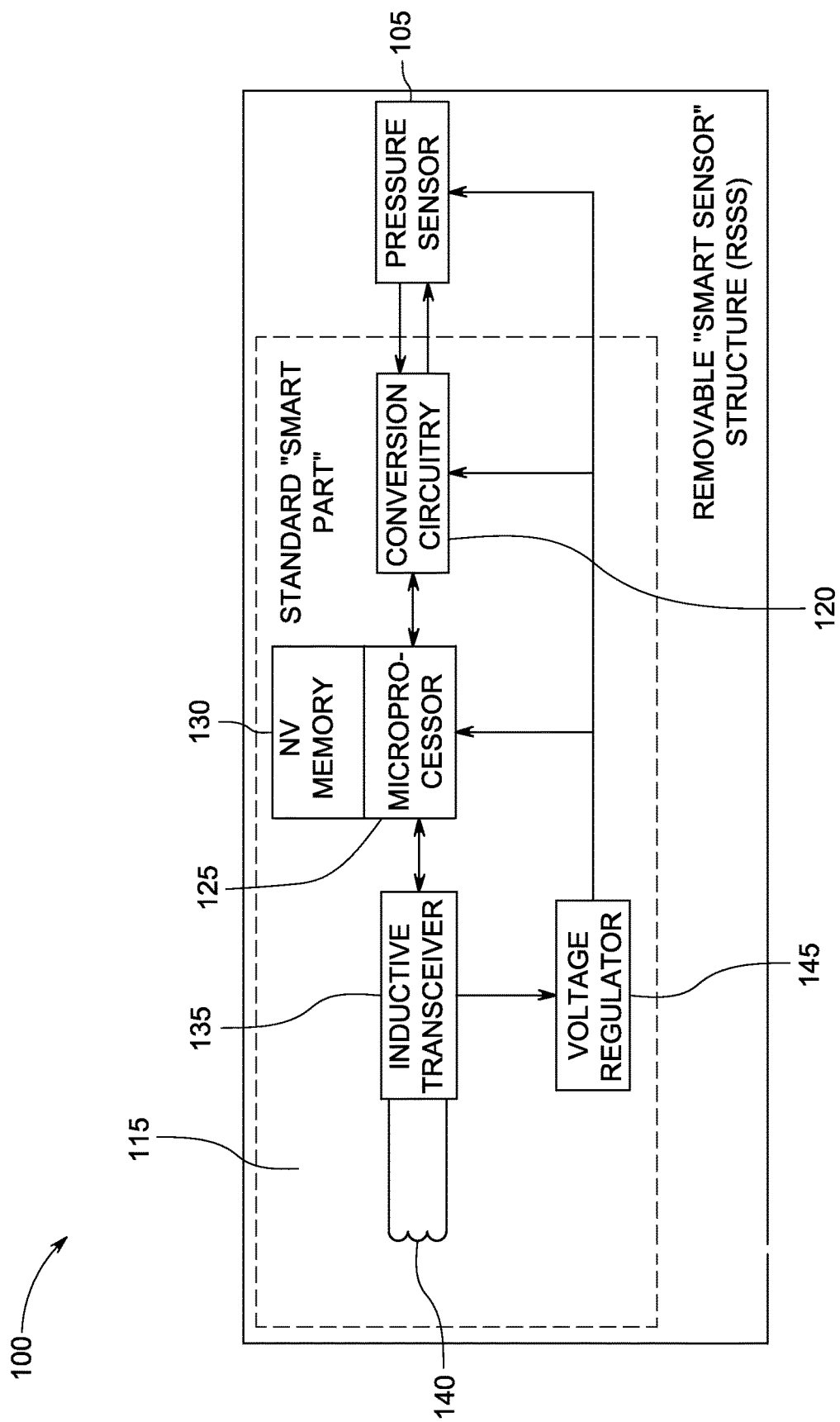
FIG. 2c is a block diagram of an RSSS in accordance with an embodiment of the current invention.
Figure 2D:
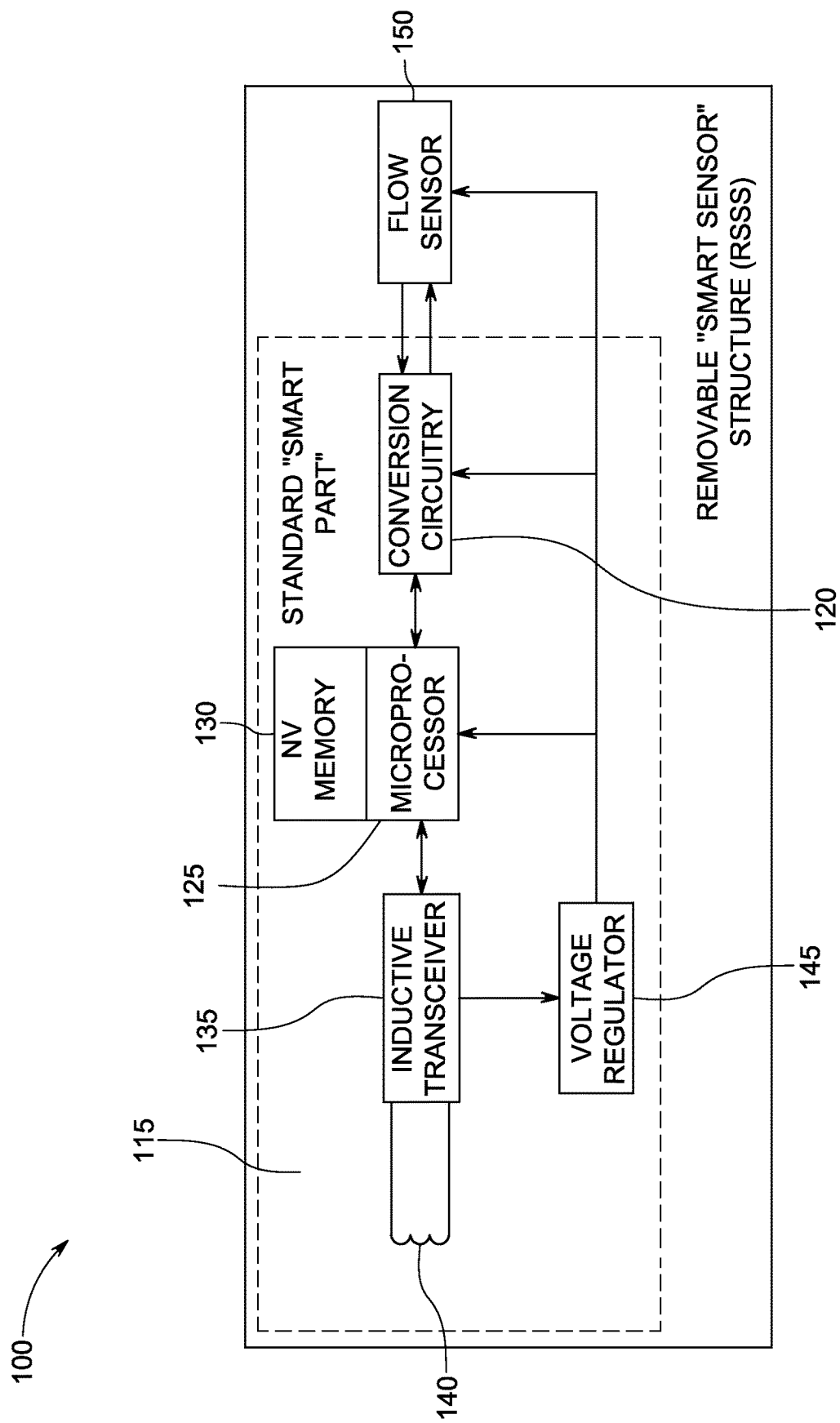
FIG. 2d is a block diagram of an RSSS in accordance with an embodiment of the current invention.

Turning to FIGS. 2b, 2c, and 2d, it is contemplated that in some embodiments of RSSS 100, only one of pressure sensor 105, flow sensor 150, or conductivity sensor 110 is present on an RSSS 100. Accordingly, only measurements pertaining to the present sensor will be calculated by microprocessor 125 and sent to CDTC 200. Accordingly, if only pressure sensor 105 is present on RSSS 100, microprocessor 125 will only calculate the pressure measurement based on the output of pressure sensor 105, and send the measurement to CDTC 200 for transmission by RF transceiver 245. Further, if only conductivity sensor 110 is present on RSSS 100, microprocessor 125 will only calculate measurements for the individual analyte concentrations and total analyte concentration based on the output of conductivity sensor 110, and send the measurements to CDTC 200 for transmission by RF transceiver 245. Additionally, if only flow sensor 150 is present on RSSS 100, microprocessor 125 will only calculate the flow rate measurement based on the output of flow sensor 150, and send the measurement to CDTC 200 for transmission by RF transceiver 245.

Figure 5:
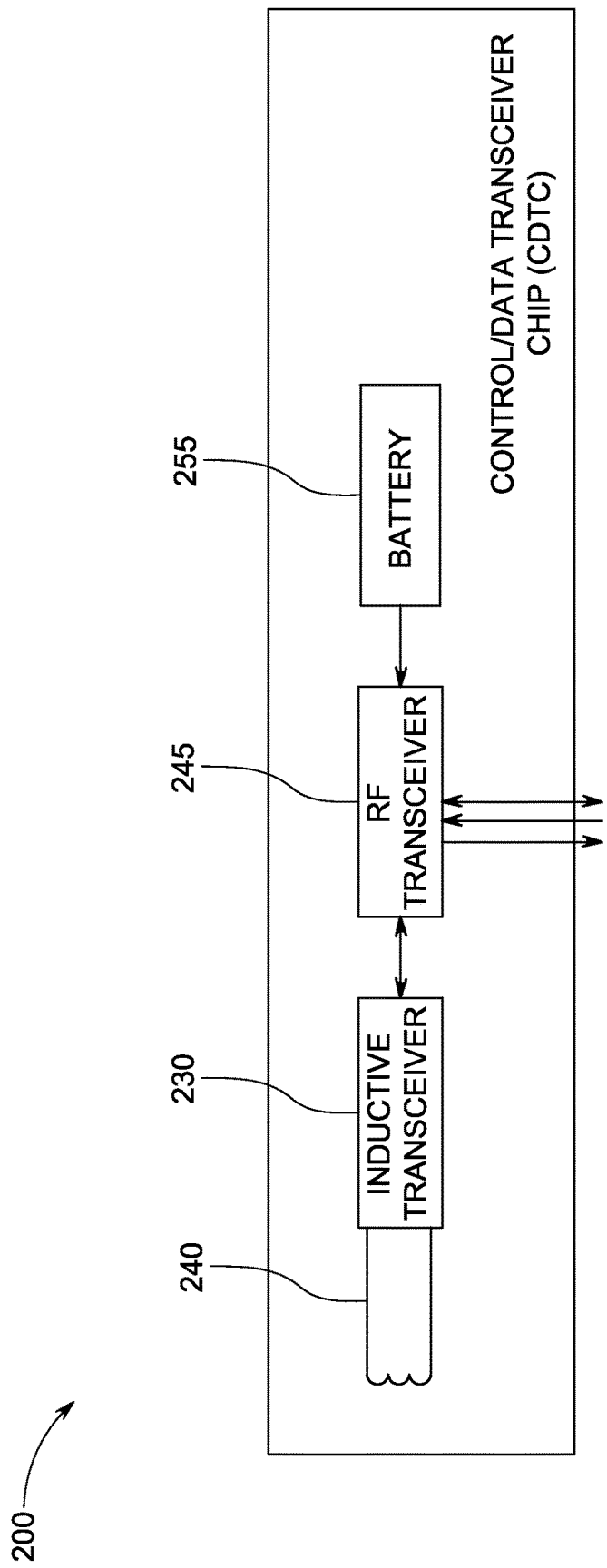
FIG. 5 is a block diagram of a CDTC in accordance with an embodiment of the current invention.

Turning to FIG. 5, CDTC 200 is comprised of coil 240, inductive transceiver 230, RF transceiver 245, and optionally battery 255. RF transceiver 245 provides power to inductive transceiver 230 and coil 240, which then provide power to RSSS 100. RF transceiver sources power from battery 255, if present, or RF signals.

Coil 240 and inductive transceiver 230 provide RF transceiver 245 with the flow rate, individual analyte concentrations, total analyte concentration, and pressure from RSSS 100. RF transceiver 245 transmits the unique ID number, flow rate, individual analyte concentrations, total analyte concentration, and pressure to RTU 402. Further, RTU 402 periodically requests a measurement from MEMS sensor 10, at which time RF transceiver 245 prompts microprocessor 125 to obtain the flow rate, individual analyte concentrations, total analyte concentration, and pressure measurements. RF transceiver 245 prompts microprocessor 125 by sending a unique signal through CDTC inductance transceiver 230, CDTC coil 240, RSSS coil 140, and RSSS inductance transceiver 135. RF transceiver 245 operates using a common wireless protocol including, but not limited to, Zigbee or Bluetooth, which allows RF transceiver 245 to transmit a signal between about 10-100 feet.

Some embodiments of MEMS sensor 10 uses one or both of smart power or smart monitoring. Smart power means that once MEMS sensor 10 completes a transmission of measurement values, MEMS sensor 10 will enter a low power mode until MEMS sensor 10 is prompted for another measurement.

Smart monitoring means that MEMS sensor 10 only acquires a new set of measurements when prompted for a measurement by RF transceiver 245, as opposed to other designs which constantly acquire new outputs from the sensors and calculate new measurement values based on the sensor outputs, but only transmit the most recent measurement values when prompted, thereby wasting a large amount of power on acquiring new sensor outputs and calculating measurement values that are never transmitted.

Figure 6:
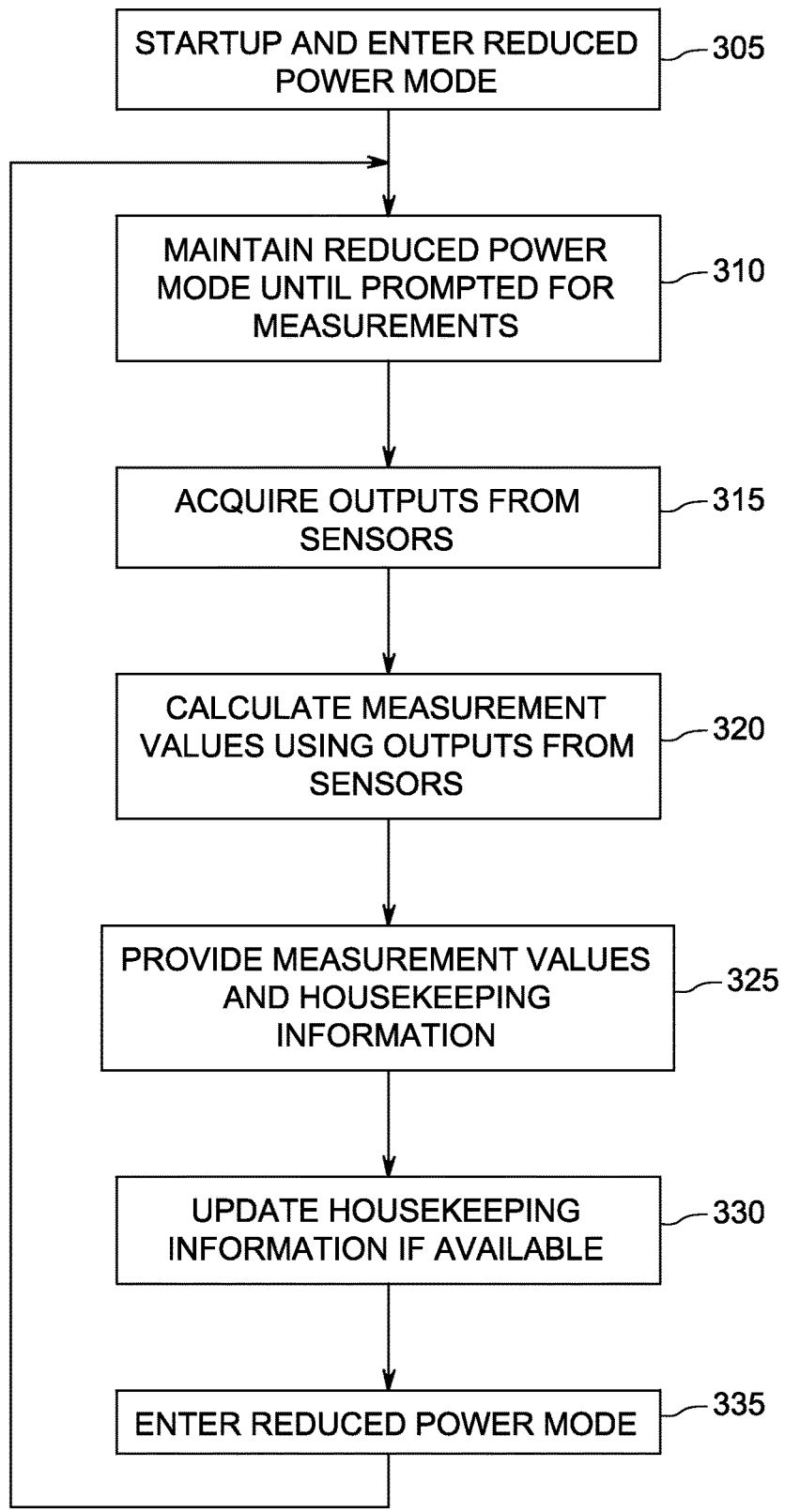
FIG. 6 is a flowchart depicting the processes taking place within the microprocessor of the MEMS sensor in accordance with an embodiment of the current invention.

FIG. 6 is a flow chart of the processes taking place within microprocessor 125. The instructions for carrying out the processes of FIG. 6 are stored in non-volatile memory 130 and retrieved by microprocessor 125. In step 305, microprocessor 125 powers on, initializes, and immediately enters a reduced power mode. Following step 305, in step 310 the reduced power mode is maintained until microprocessor 125 is prompted by RF transceiver 245 to acquire measurement values for flow rate, individual analyte concentrations, total analyte concentration, and fluid pressure. Following step 310, in step 315, RF transceiver 245 then enters full power mode, and acquires outputs of pressure sensor 105, flow sensor 150, and conductivity sensor 110. Following step 315, in step 320, microprocessor 125 ascertains measurement values for flow rate, individual analyte concentrations, total analyte concentration, and fluid pressure using the outputs of pressure sensor 105, flow sensor 150, and conductivity sensor 110. Following step 320, in step 325, microprocessor 125 provides the measurement values and housekeeping information stored in non-volatile memory 130 to RF transceiver 245 for transmission. Following step 325, in step 330 microprocessor 125 updates the housekeeping information stored in non-volatile memory 130 if updates are provided to MEMS sensor 10 by supervisory control and data acquisition unit (SCADA) 460. Following step 330, in step 335, microprocessor 125 re-enters the reduced power mode and returns to step 310.

Figure 7A:
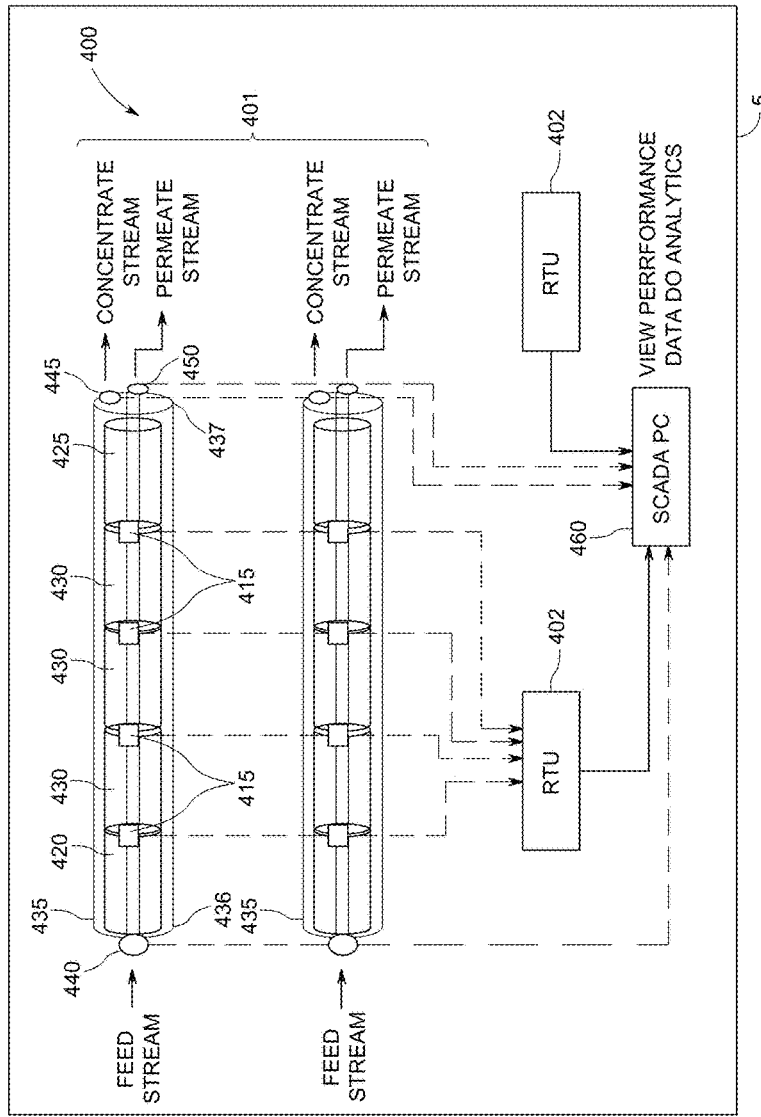
FIGS. 7a-b are diagrams of the topology of a MEMS sensor system for a membrane based water filtration plant in accordance with an embodiment of the current invention.
Figure 7B:
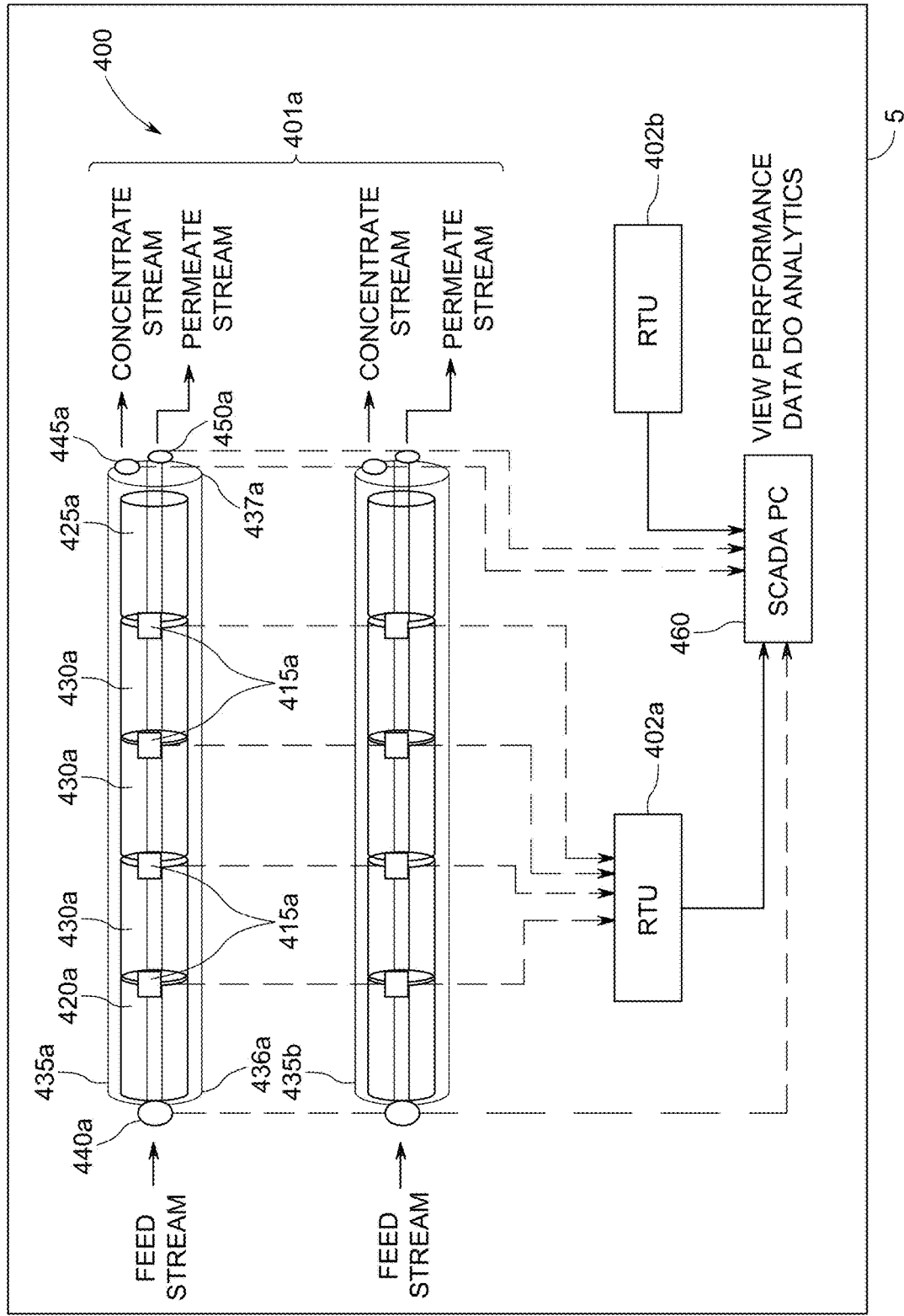

FIGS. 7*a-b* are diagrams of the topology of MEMS sensor system 400 for train 401 located in a membrane based water filtration plant 5. MEMS sensor system 400 for train 401 is comprised Remote Telemetry Unit (RTU) 402, SCADA 460, and MEMS sensors 10. Besides train 401*a*, it is contemplated that MEMS sensor system 400 may monitor other additional trains 401*b-n* (not shown), with "n" being the letter of the alphabet corresponding with the number of trains being monitored. Each additional train 401*b-n*, will also have a corresponding RTU 400*b-n* which interface with SCADA 460.

Even though only two membrane vessels are depicted in FIGS. 7*a-b*, it is contemplated that each train 401*a-n* can have any number of membrane vessels. For purposes of brevity, only membrane vessel 435*a* will be discussed since the other membrane vessels, such as membrane vessel 435*b*, will operate and be configured in a similar fashion. It is contemplated that train 401 can be comprised of RO membranes or NF membranes.

Membrane vessel 435*a* is comprised of lead membrane element 420*a* located at membrane vessel entrance 436*a*, terminating membrane element 425*a* located at membrane vessel exit 437*a*, and one or more interior membrane elements 430*a* located between lead membrane element 420*a* and terminating membrane element 425*a*. MEMS sensors 10 are located at each interface 415 of membrane elements 420, 425, and 430 as shown in FIGS. 7*a-b* and communicate with RTU 400*a* using RF communication, including, but not limited to, Wi-Fi, Bluetooth, or ZigBee. RTU 400*a* communicates with SCADA 460 using Ethernet or RF communication.

Figure 13A:
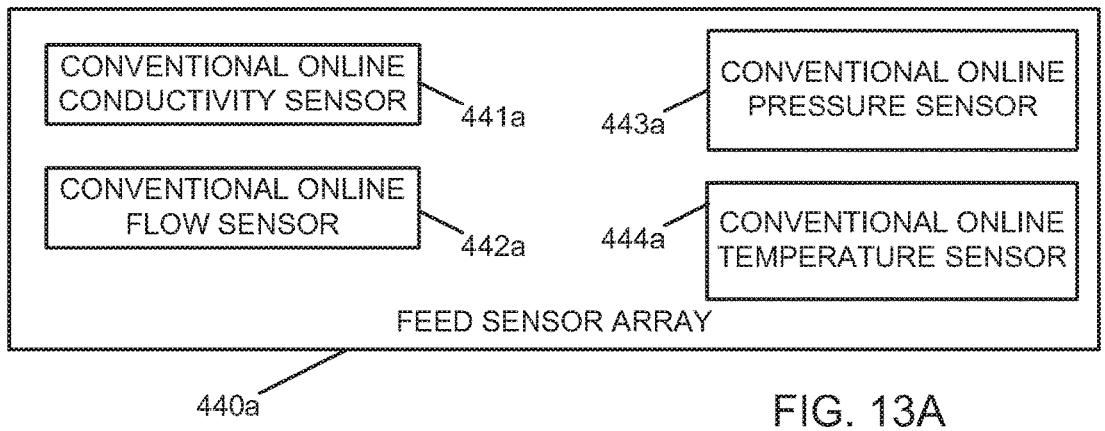
FIG. 13a is a block diagram of a feed sensor array in accordance with an embodiment of the current invention.
Figure 13B:
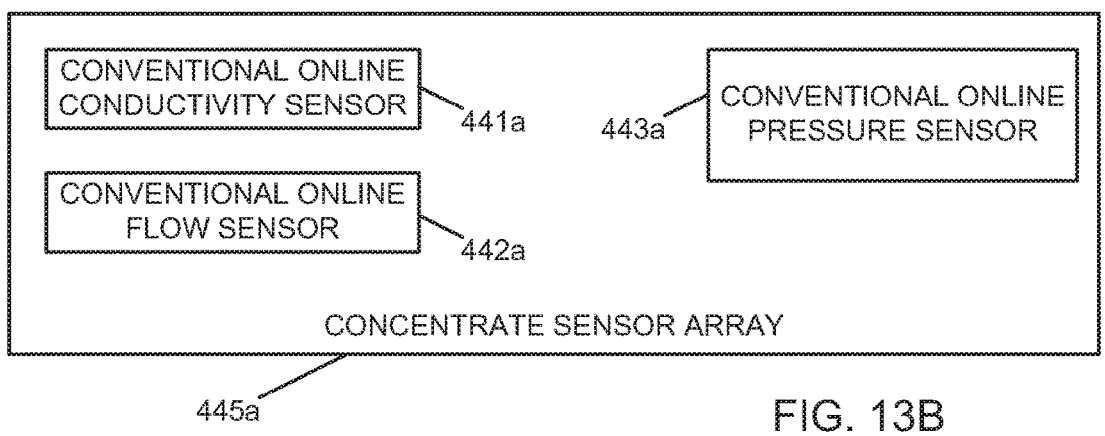
FIG. 13b is a block diagram of a concentrate sensor array in accordance with an embodiment of the current invention.
Figure 13C:
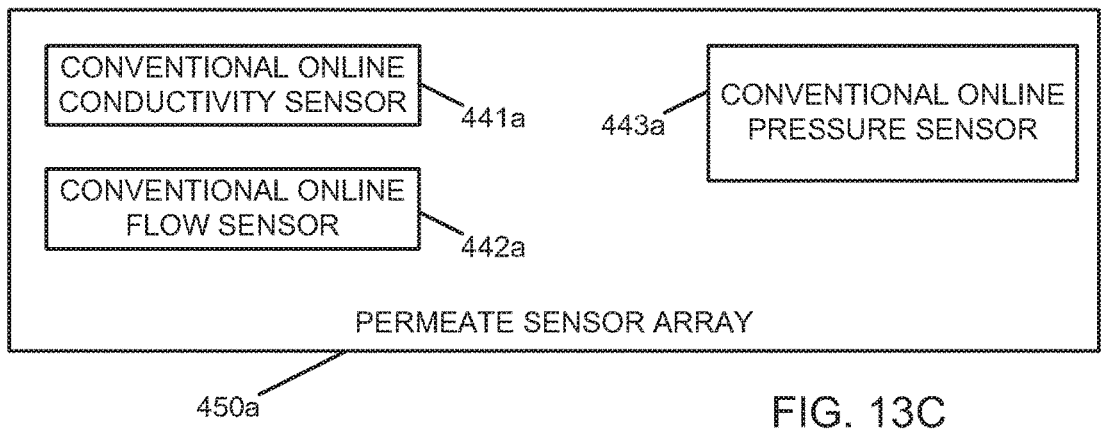
FIG. 13c is a block diagram of a permeate sensor array in accordance with an embodiment of the current invention.

Further, a feed sensor array 440*a*, concentrate sensor array 445*a*, and permeate sensor array 450*a*, each having conventional online flow 442*a*, pressure 443*a*, and conductivity 441*a* sensors, are located in the feed, concentrate, and permeate streams at the entry and exit of membrane vessel 435*a*, and depicted in FIGS. 13*a-c*. The feed sensor array 440*a*, concentrate sensor array 445*a*, and permeate sensor array 450*a* and provide the flow rate, individual analyte concentrations, total analyte concentration, and fluid pressure for the feed, concentrate, and permeate streams. Feed sensor array 440*a* also has a conventional online temperature sensor 444*a*, which provides the temperature of the feed stream. Conventional online temperature 444*a*, flow 442*a*, pressure 443*a*, and conductivity 441*a* sensors may include, but are not limited to, those described in U.S. Pat. Nos. 4,682,113 and 7,584,061. Feed sensor array 440*a*, concentrate sensor array 445*a*, and permeate sensor array 450*a* interface with SCADA 460 using Ethernet or RF communication.

Figure 8B:
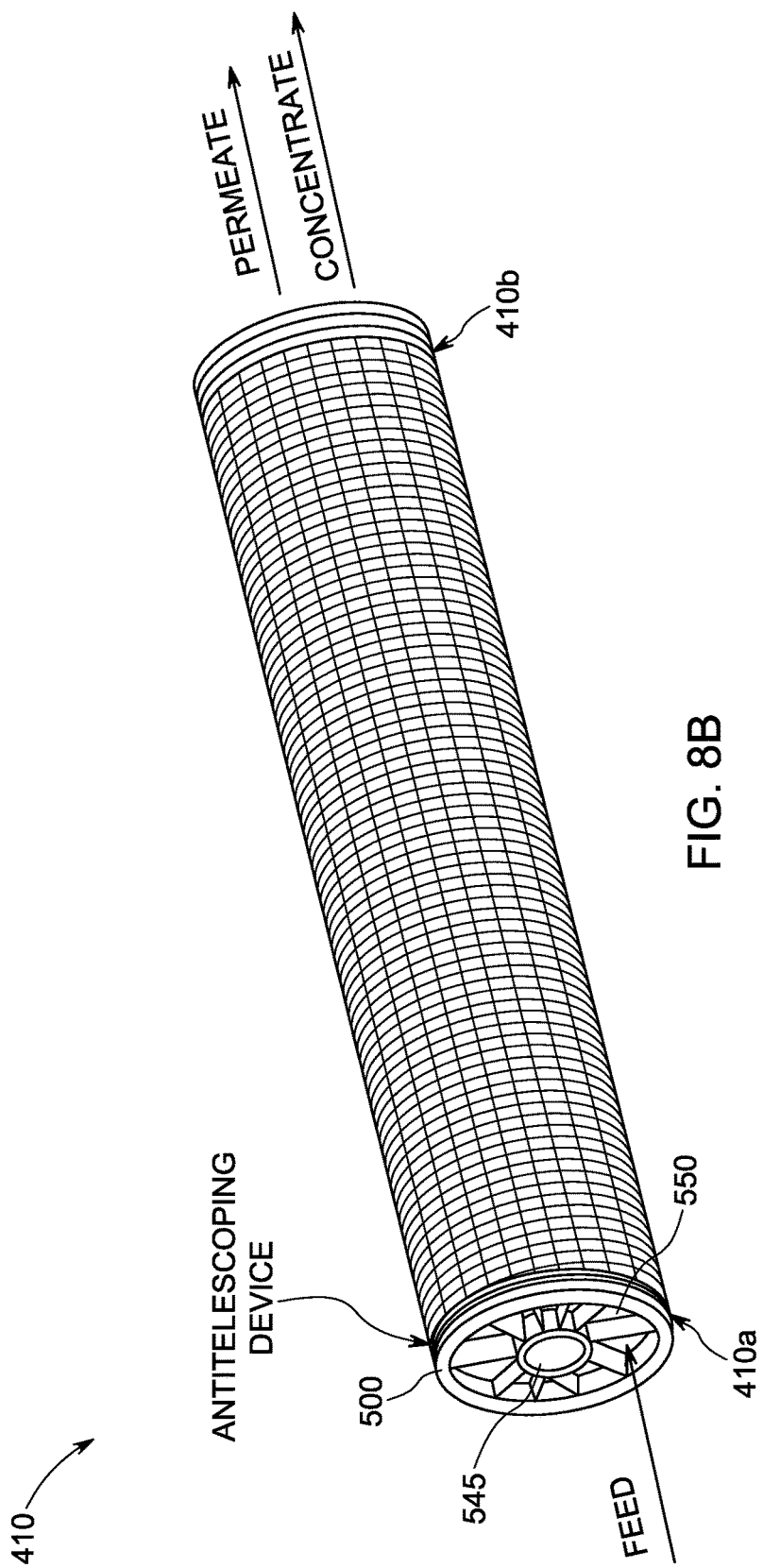

Turning to FIGS. 8*a-b*, feed enters ATD exterior aperture 550 at the upstream end 410*a* of membrane element 410. Concentrate exits exterior aperture 550 of the downstream end 410*b* of membrane element 410. Permeate exits interior aperture 545 of the downstream end 410*b* of membrane element 410. It is understood that membrane element 410 may be lead membrane element 420, interior membrane element 430, or terminating membrane element 425.

Figure 9A:
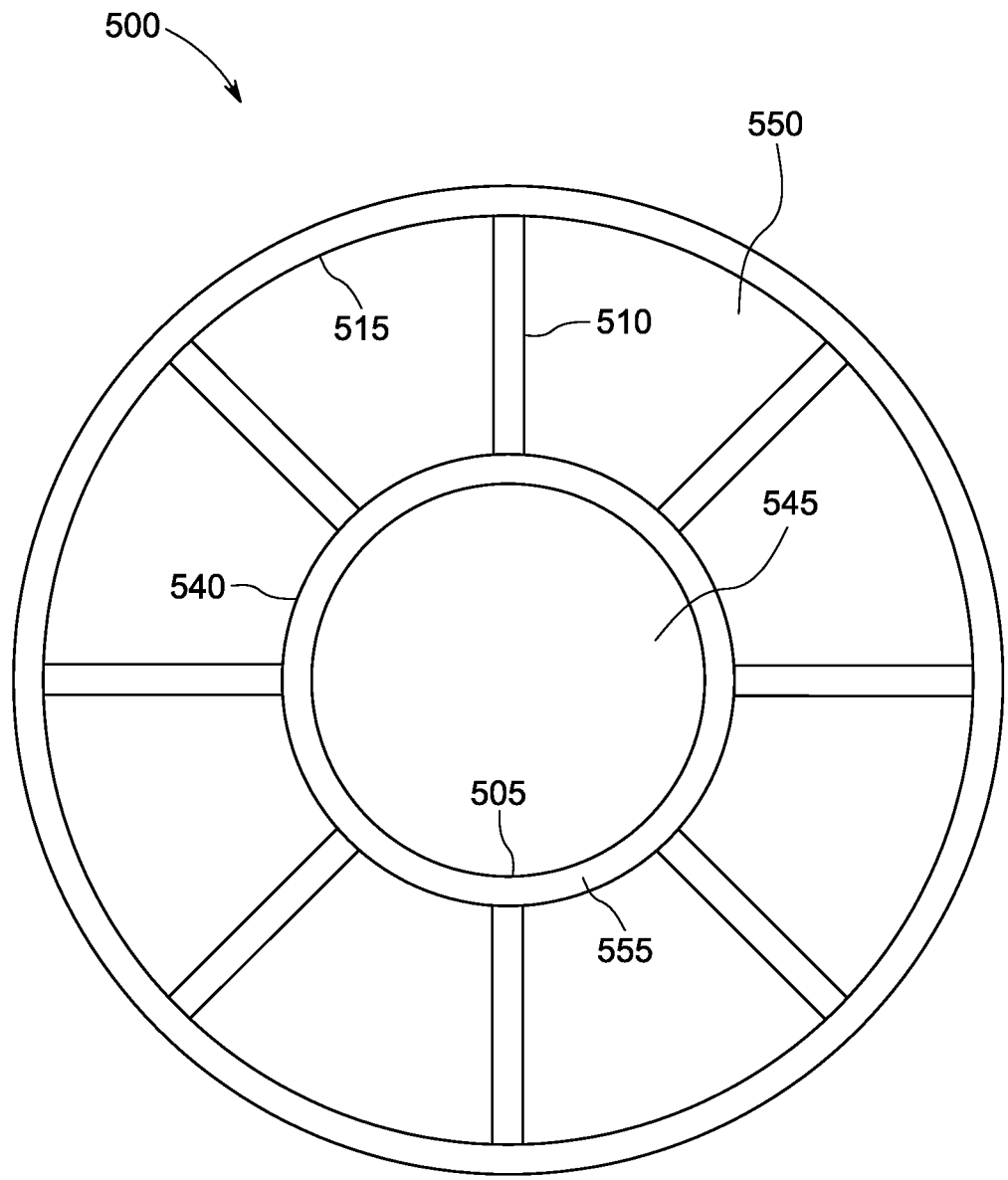
FIGS. 9a-c are ATUs of a membrane element in accordance with embodiments of the current invention.
Figure 9B:
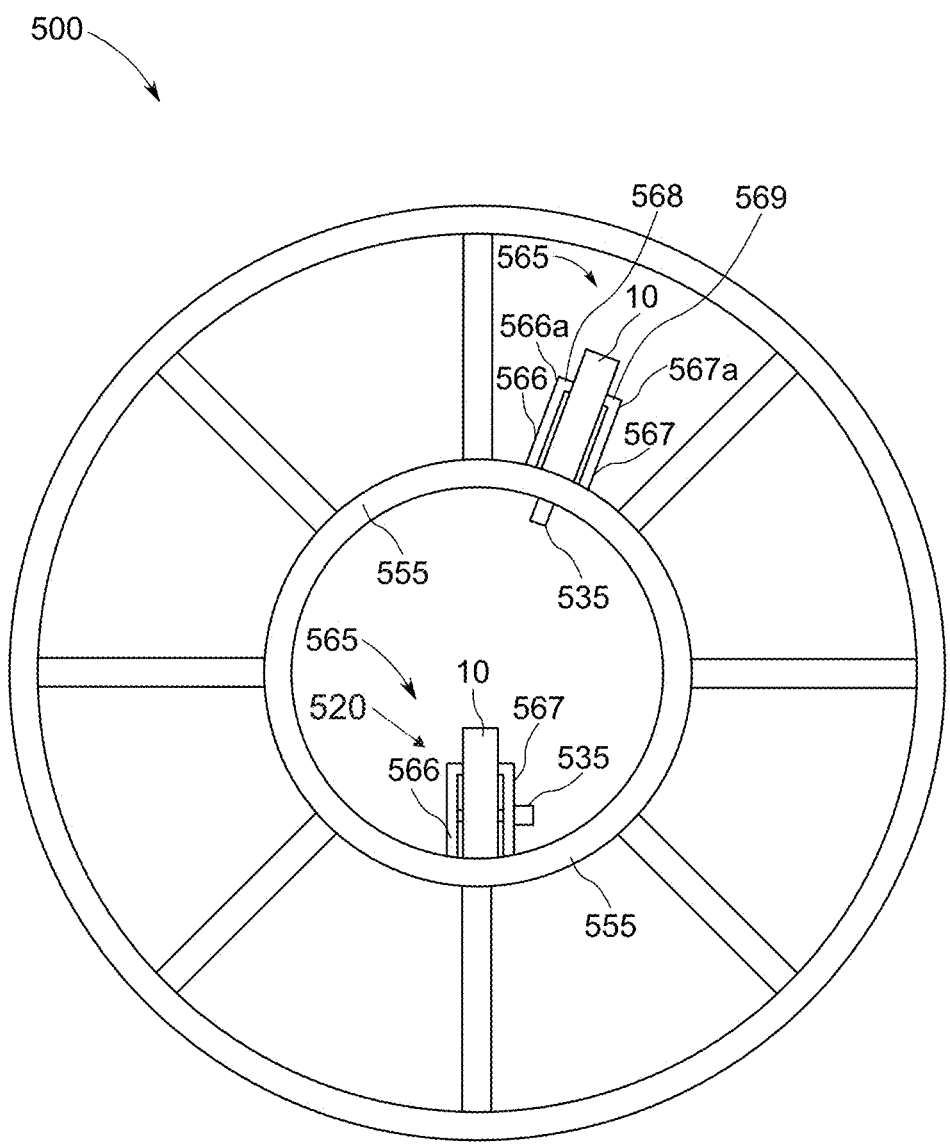
Figure 9C:
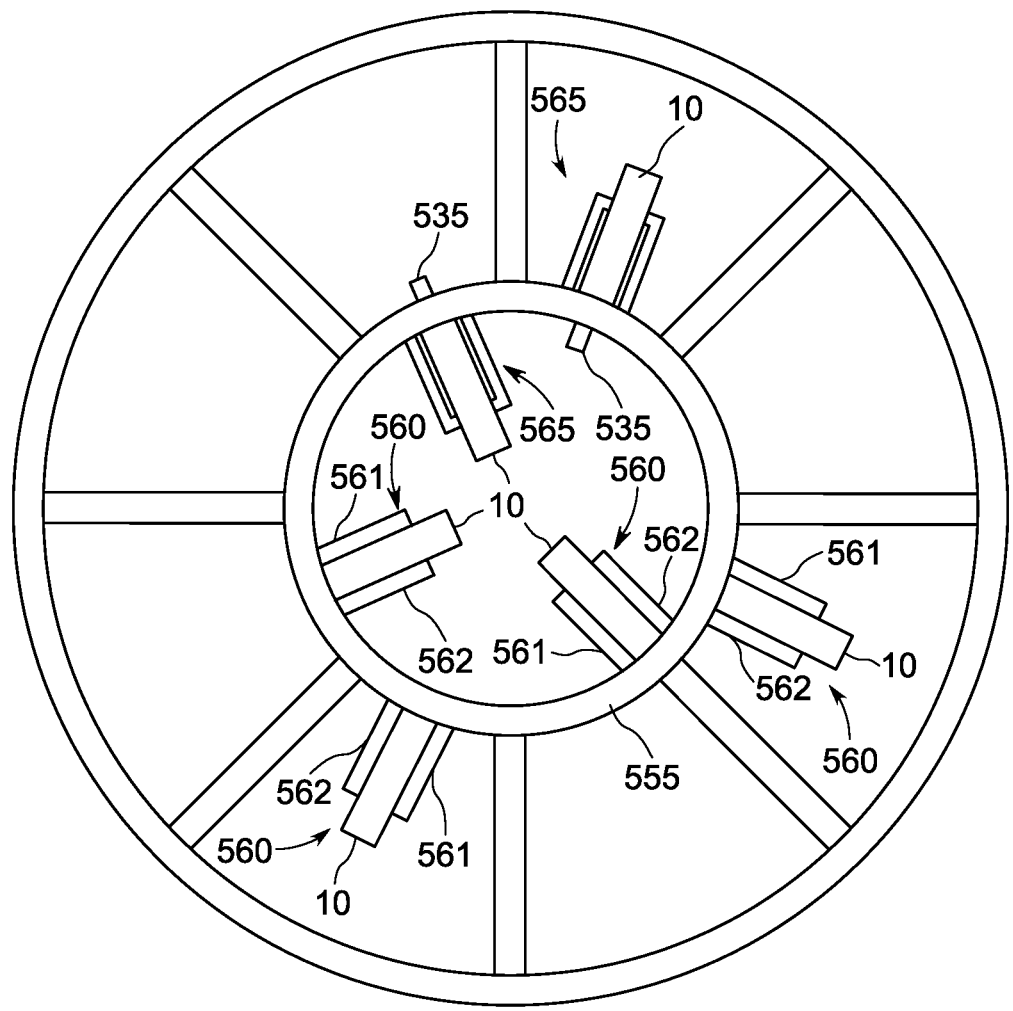

Referring to FIGS. 9*a-c*, MEMS sensors 10 at the interfaces 415*a* of membrane elements 420*a*, 425*a*, and 430*a* of FIG. 7. MEMS sensors 10 are mounted to the anti-telescoping device (ATD) 500 of a membrane located at interfaces 415*a*, which are shown in FIG. 7.

ATD 500 has an interior aperture 545 and exterior aperture 550. Interior aperture 545 is defined by the inner interior aperture wall 505. Exterior aperture 550 is defined by upper exterior aperture wall 515 and lower exterior aperture wall 540. Permeate tube 555 is defined by lower exterior aperture wall 540 and inner interior aperture wall 505. ATD reeds extend from the upper exterior aperture wall 515 to the lower exterior aperture wall 540.

MEMS sensors 10 are mounted in slots 520 formed in ATD 500. Slots 520 can be press-fit slots 560 or fastener slots 565. In one embodiment, arms 561-562 of press-fit slots 560 contact MEMS sensor 10 along the entire length of arms 561-562. However, it is contemplated that in other embodiments, arms 561-562 of press-fit slots 560 may only contact MEMS sensor 10 along part of the length of arms 561-562.

In one embodiment of fastener slot 565, the distal end 566*a*-567*a* of arms 566-567 have a jog 568-569 that contacts MEMS sensor 10. Further, MEMS sensor 10 is mounted in fastener slot 565 with a fastener 535, such as a bolt or screw. In one embodiment, fastener 535 is inserted through arms 566-567, and in another embodiment, fastener 535 is inserted through ATD permeate tube 555.

Further, FIG. 9*b* shows MEMS sensors 10 which contains conductivity sensor 110, flow sensor 150, and pressure sensor 105. Accordingly, only one MEMS sensor 10 is needed in each of the permeate and concentrate streams to monitor the conductivity, flow rate, and pressure of the water in the streams at interfaces 415*a*. The MEMS sensors 10 depicted in FIG. 9*c* do not contain a conductivity sensor 110, flow sensor 150, and pressure sensor 105. Accordingly, a first MEMS sensor 10 containing a conductivity sensor 110, a second MEMS sensor 10 containing a pressure sensor 105, and a third MEMS sensor 10 containing a flow sensor 150 are needed in each of the feed, permeate, and concentrate streams at interfaces 415a.

Turning to FIGS. 7-9, at each membrane element interface 415, since the concentrate exiting the ATD exterior aperture 550 of the upstream membrane element 410 becomes the feed and enters the ATD exterior aperture 550 of the downstream membrane element 410, it is understood that a MEMS sensor 10 placed in the ATD exterior aperture 550 to monitor the concentrate of the membrane element 410 immediately upstream of MEMS sensor 10 also monitors the feed of the membrane element 410 immediately downstream of MEMS sensor 10.

Figure 10:
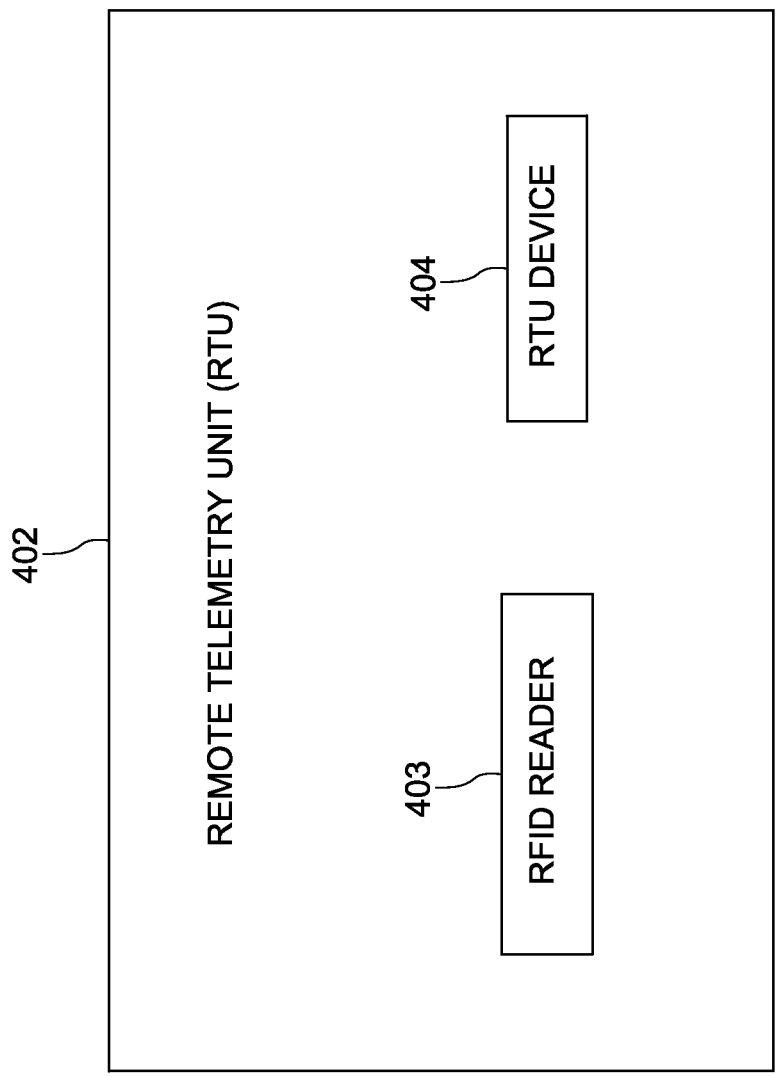
FIG. 10 is an RTU in accordance with an embodiment of the current invention.

Turning to FIG. 10, RTU 402 is comprised of an RFID reader 403 and an RTU device 404. In one embodiment, RFID reader 403 is connected via serial port to RTU device 404. RTU device 404 communicates wirelessly with MEMS sensors 10 and sends data to and from SCADA 460. SCADA 460 accumulates and stores pressure, flow rate, and conductivity measurement values from MEMS sensors 10, membrane vessel feed stream sensor array 440, membrane vessel concentrate stream sensor array 445, and membrane vessel permeate stream sensor array 450. Additionally, SCADA 460 accumulates and stores the fluid temperature measurement values from membrane vessel feed stream sensor array 440. Further, SCADA 460 reports the measured data and calculated data values described below to a user. The calculated data can include, but is not limited to normalized permeate flow for a membrane element, increase in normalized pressure differential for a membrane element, and increase in normalized salt passage for a membrane element. In one embodiment, SCADA 460 is a PC. Accordingly, SCADA 460 can be integrated with data analytics software, and can send data to remote locations via IP or mobile telephony (e.g. GPRS, 3G, 4G, etc).

Figure 11:
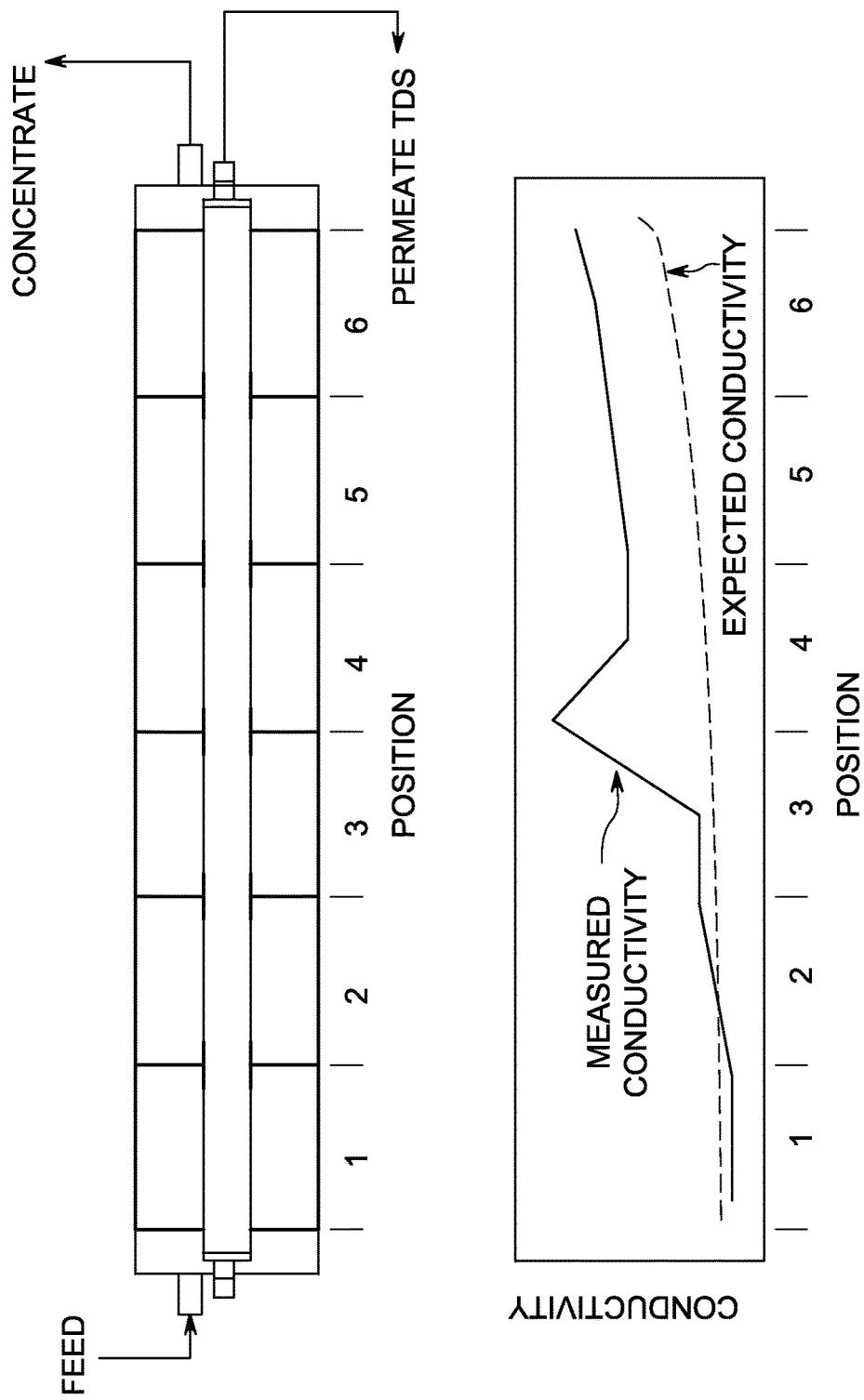
FIG. 11 is graph showing the measured total conductivity data for a membrane vessel containing a membrane element with an interconnector O-ring failure and the expected total conductivity data for the same membrane vessel containing membrane elements with intact interconnector O-rings.

FIG. 11 shows the measured total conductivity and expected total conductivity of the permeate for a membrane vessel 435 containing a plurality of membrane elements 410. As can be seen from looking at the measured conductivity and expected conductivity of permeate, there appears to be an interconnector O-ring failure at the membrane interface 415 between the third and fourth membrane elements 410, which results in an increase of measured conductivity.

Further, this invention comprises a method of using a MEMS sensor system 400 to monitor membranes elements 410 in a membrane vessel 435 of a train 401.

When monitoring the performance of membrane elements 410, data is collected and normalized. Data normalization is a process that corrects for changes in temperature, feed TDS, pressures, and other factors that affect the performance of RO/NF membrane elements 410 in a membrane based water purification plant, but may be unrelated to fouling or other membrane degradation processes. Typically, as a membrane based water purification plant runs membrane elements 410 slowly foul over time. To compensate for this, the operating pressure of membrane vessel 435 in train 401 is increased. The normalized flow rate shows what the flow rate would be if the feed pressure were not increased and therefore measures the degree of membrane element fouling that has occurred. Feed pressures for a membrane vessel 435 typically range from 150 to 450 psig. Further, data normalization helps to compensate for non-constant feed water temperature.

Normalized permeate flow rate, normalized differential pressure, and normalized salt passage are calculated and monitored for each membrane element 410. In some embodiments, in addition to monitoring and calculating the normalized permeate flow rate, normalized differential pressure, and normalized salt passage for each membrane element 410 in a membrane vessel 435, the normalized permeate flow rate, normalized differential pressure, and normalized salt passage are also calculated and monitored for each membrane vessel 435 as a whole. The equations and underlying data used to calculate the normalized permeate flow rate, normalized differential pressure, and normalized salt passage for each membrane element 410 and membrane vessel 435 are discussed below.

For normalized permeate flow rate, a Temperature Correction Factor (TCF) is used to predict what permeate flow rate a membrane element 410 will produce at a temperature different from the temperature specified by manufacturer's permeate flow rating. Net Driving Pressure (NDP) and temperature influence the permeability of the membrane to water. NDP is a function of the applied pressure, pressure drop, osmotic pressure, and permeate pressure of the system. As NDP increases, the membrane will produce more water, and the permeate flow rate increases. Likewise, as temperature increases, the membrane element 410 becomes more permeable, and the permeate flow rate increases. A Temperature Correction Factor (TCF) correlates change in permeate flow rate to change in temperature. By multiplying the given flow rate by ratios of initial and specified values of both the NDP and Temperature Correction Factor (TCF), the normalized permeate flow rate is found.

Equation 1 is the formula for the normalized permeate flow rate of a membrane element 410:

$$Q_N = Q_t \times (NDP_r/NDP_t) \times (TCF_r/TCF_t)$$

Where:
$Q_N$=Normalized permeate flow rate at time "t" of membrane element
$Q_t$=Actual permeate flow rate at time "t" of membrane element (obtained from flow sensor 150 of MEMS sensor 10 located in permeate stream of membrane element 410, when membrane element 410 is a lead membrane element 420 or an interior membrane element 430; obtained from flow sensor of membrane vessel permeate stream sensor array 450 when membrane element 410 is a terminating membrane element 425)
$NDP_r$=Net Driving Pressure at reference conditions (obtained using Equation 2)
$NDP_t$=Net Driving Pressure at time "t" (obtained using Equation 2)
$TCF_r$=TCF for temperature at reference conditions (TCF is provided by the membrane element manufacturer in tabular or equation form and is dependent upon the membrane vessel feed temperature)
$TCF_t$=TCF for temperature at time "t" (TCF is provided by the membrane element manufacturer in tabular or equation form and is dependent upon the membrane vessel feed temperature)

The standard or alternate form of Equation 2 gives the formula for Net Driving Pressure (NDP) of a membrane element 410:

$$NDP = P_f - \tfrac{1}{2} * \Delta P_{fb} - P_{osm} - P_p \text{ (standard form)}$$

$$\text{or } NDP = (P_f - P_p - (P_f - P_b)/2) - P_{osm} \text{ (alternate form)}$$

Where:
$P_f$=Feed Pressure at time "t" (measurement of pressure sensor 105 of MEMS sensor 10 located in feed stream of membrane element 410 when membrane element 410 is a terminating membrane element 425 or an interior membrane element 430; measurement of pressure sensor of membrane vessel feed water stream sensor array 440 when membrane element 410 is a lead membrane element 420)

$\Delta P_{fb}$=Pressure difference between the feed and concentrate streams of membrane element 410 (difference between measurement of pressure sensor 105 of MEMS sensor 10 located in the feed stream of membrane element 410 and measurement of pressure sensor 105 of MEMS sensor 10 located in the concentrate stream of membrane element 410 when membrane element 410 is an interior membrane element 430; difference between measurement of pressure sensor 105 of MEMS sensor 10 located in the feed stream of membrane element 410 and measurement of pressure sensor of membrane vessel concentrate stream sensor array 445 when membrane element 410 is a terminating membrane element 425; difference between measurement of pressure sensor of membrane vessel feed water sensor array 440 and measurement of pressure sensor 105 of MEMS sensor 10 located in the concentrate stream of membrane element 410 when membrane element 410 is a lead membrane element 420)

$P_{osm}$=Osmotic pressure at time "t" (available as a function of TDS and temperature using equation 3)

$P_p$=Permeate pressure at time "t" (measurement of pressure sensor 105 of MEMS sensor 10 located in permeate stream of membrane element 410 when membrane element 410 is a lead membrane element 420 or interior membrane element 430; measurement of pressure sensor of membrane vessel permeate stream sensor array 450 located in permeate stream of membrane element 410 when membrane 410 is a terminating membrane element 425)

$P_b$=Brine (concentrate) pressure at time "t" (measurement of pressure sensor 105 of MEMS sensor 10 located in concentrate stream of membrane element 410 when membrane element 410 is a lead membrane element 420 or interior membrane element 430; measurement of pressure sensor of membrane vessel concentrate stream sensor array 445 located in permeate stream of membrane element 410 when membrane element 410 is a terminating membrane element 425)

Osmotic pressure of a membrane element 410 is available as a function of total conductivity value of the feed stream of the membrane element and temperature of the membrane vessel feed stream using equation 3:

$$P_{osm} = CRT$$

Where:
c=0.5*Conductivity of feed stream (for sea water feed stream);
c=0.65*Conductivity of feed stream (for brackish water feed stream)
  Conductivity of feed stream value is total conductivity value of the feed stream of membrane element 410 (measured using conductivity sensor 110 of MEMS sensor 10 placed in feed stream of membrane element 410 when membrane element 410 is an interior membrane element 430 or a terminating membrane element 425; measured using conductivity sensor of membrane vessel feed water sensor 440 when membrane element 410 is a lead membrane element 420)

R=0.0821 L atm K$^{-1}$ mol$^{-1}$ is the gas constant

T is the thermodynamic (absolute) temperature (K) of the membrane vessel feed stream (measured using the temperature sensor of membrane vessel feed water sensor array 440)

Normalized salt passage of a membrane element 410 is available as a function of net driving pressure and actual salt passage using equation 4 below:

$$\text{Normalized Salt Passage, } SP_N = \% \, SP_a * (NDP_t / NDP_r)$$

Where,
NDP$_r$=Net Driving Pressure at reference conditions (obtained using equation 2 above)
NDP$_t$=Net Driving Pressure at time t (obtained using equation 2 above)

$$\% \, SP_a = (K_p/K_b)*100$$

$K_p$=total conductivity value of the permeate stream of membrane element 410 (measurement of conductivity sensor 110 of MEMS sensor 10 located in permeate stream of membrane element 410 when membrane element 410 is a lead membrane element 420 or interior membrane element 430; measurement of conductivity sensor of membrane vessel permeate stream sensor array 450 located in permeate stream of membrane element 410 when membrane 410 is a terminating membrane element 425)

$K_f$=total conductivity value of the feed stream of membrane element 410 (measured using conductivity sensor 110 of MEMS sensor 10 placed in feed stream of membrane element 410 when membrane element 410 is an interior membrane element 430 or a terminating membrane element 425; measured using conductivity sensor of membrane vessel feed water sensor 440 when membrane element 410 is a lead membrane element 420)

Normalized differential pressure (DP$_N$) of a membrane element 410 is available as a function of the actual differential pressure, permeate flow rate, and the actual temperature correction factor using equation 5 below:

$$DP_N = DP_A * (Q_r)/(Q_t) * TCF_t$$

Where:
TCF$_t$=TCF for temperature at time "t" (TCF is provided by the membrane element manufacturer in tabular or equation form and is dependent upon the membrane vessel feed temperature)
$Q_r$=Permeate flow rate of membrane element at reference conditions (obtained from flow sensor 150 of MEMS sensor 10 located in permeate stream of membrane element 410 when membrane element 410 is a lead membrane element 420 or an interior membrane element 430; obtained from flow sensor of membrane vessel permeate stream sensor array 450 when membrane element 410 is a terminating membrane element 425)
$Q_t$=Actual permeate flow rate of membrane element at time "t" (obtained from flow sensor 150 of MEMS sensor 10 located in permeate stream of membrane element 410 when membrane element 410 is a lead membrane element 420 or an interior membrane element 430; obtained from flow sensor of membrane vessel permeate stream sensor array 450 when membrane element 410 is a terminating membrane element 425)

$$DP_A = P_f - P_p$$

$P_f$=Feed pressure at time "t" (measurement of pressure sensor 105 of MEMS sensor 10 located in feed stream of membrane element 410 when membrane element 410 is a terminating membrane element 425 or an interior membrane element 430; measurement of pressure sensor of membrane vessel feed water stream sensor array 440 when membrane element 410 is a lead membrane element 420)

$P_p$=Permeate pressure at time "t" (measurement of pressure sensor 105 of MEMS sensor 10 located in permeate stream of membrane element 410 when membrane element 410 is a lead membrane element 420 or interior membrane element 430; measurement of pressure sensor of membrane vessel permeate stream sensor array 450 located in permeate stream of membrane element 410 when membrane element 410 is a terminating membrane element 425)

Equation 6 is the formula for the normalized permeate flow rate of a membrane vessel 435:

$$Q_N = Q_t \times (NDP_r/NDP_t) \times (TCF_r/TCF_t)$$

Where:
$Q_N$=Normalized permeate flow rate at time "t" of the membrane vessel
$Q_t$=Actual permeate flow rate at time "t" of the membrane vessel (obtained from flow sensor of membrane vessel permeate stream sensor array 450)
$NDP_r$=Net Driving Pressure at reference conditions (obtained using Equation 7)
$NDP_t$=Net Driving Pressure at time "t" (obtained using Equation 7)
$TCF_r$=TCF for temperature at reference conditions (TCF is provided by the membrane element manufacturer in tabular or equation form and is dependent upon the membrane vessel feed temperature)
$TCF_t$=TCF for temperature at time "t" (TCF is provided by the membrane element manufacturer in tabular or equation form and is dependent upon the membrane vessel feed temperature)

The standard or alternate form of Equation 7 gives the formula for Net Driving Pressure (NDP) of membrane vessel 435:

$$NDP = P_f - \tfrac{1}{2} * \Delta P_{fb} - P_{osm} - P_p \text{ (standard form)}$$

or $NDP = (P_f - P_p - (P_f - P_b)/2) - P_{osm}$ (alternate form)

Where:
$P_f$=Feed Pressure at time "t" (measurement of pressure sensor of membrane vessel feed water stream sensor array 440)
$\Delta P_{fb}$=Pressure difference between the feed and concentrate streams of membrane vessel 435 (difference between measurement of pressure sensor of membrane vessel feed water sensor array 440 and measurement of pressure sensor of membrane vessel concentrate stream sensor array 445)
$P_{osm}$=Osmotic pressure at time "t" (available as a function of TDS and temperature using equation 8)
$P_p$=Permeate pressure at time "t" (measurement of pressure sensor of membrane vessel permeate stream sensor array 450)
$P_b$=Brine (concentrate) pressure at time "t" (measurement of pressure sensor of membrane vessel concentrate stream sensor array 445)

Osmotic pressure of membrane vessel 435 is available as a function of total conductivity value of the feed stream of the membrane vessel and temperature of the membrane vessel feed stream using equation 8:

$$P_{osm} = cRT$$

Where:
c=0.5*Conductivity of feed stream (for sea water feed stream);
c=0.65*Conductivity of feed stream (for brackish water feed stream)
  Conductivity of feed stream value is total conductivity value of the feed stream of membrane vessel 435 (measured using conductivity sensor of membrane vessel feed water sensor array 440)
R=0.0821 L atm K$^{-1}$ mol$^{-1}$ is the gas constant
T is the thermodynamic (absolute) temperature (K) of the membrane vessel feed stream (measured using the temperature sensor of membrane vessel feed water sensor array 440)

Normalized salt passage of membrane vessel 435 is available as a function of net driving pressure and actual salt passage using equation 9 below:

$$\text{Normalized Salt Passage, } SP_N = \% SP_a * (NDP_t/NDP_r)$$

Where,
$NDP_r$=Net Driving Pressure at reference conditions (obtained using equation 7 above)
$NDP_t$=Net Driving Pressure at time t (obtained using equation 7 above)

$$\% SP_a = (K_p/K_b) * 100$$

$K_p$=total conductivity value of the permeate stream of membrane vessel 435 (measurement of conductivity sensor of membrane vessel permeate stream sensor array 450)
$K_f$=total conductivity value of the feed stream of membrane vessel 435 (measured using conductivity sensor of membrane vessel feed water sensor 440)

Normalized differential pressure ($DP_N$) of membrane vessel 435 is available as a function of the actual differential pressure, permeate flow rate, and the actual temperature correction factor using equation 10 below:

$$DP_N = DP_A * (Q_r)/(Q_t) * TCF_t$$

Where:
$TCF_t$=TCF for temperature at time "t" (TCF is provided by the membrane element manufacturer in tabular or equation form and is dependent upon the membrane vessel feed temperature)
$Q_r$=Permeate flow rate of membrane vessel at reference conditions (obtained from flow sensor of membrane vessel permeate stream sensor array 450)
$Q_t$=Actual permeate flow rate of membrane vessel at time "t" (obtained from flow sensor of membrane vessel permeate stream sensor array 450)

$$DP_A = P_f - P_p$$

$P_f$=Feed pressure at time "t" (measurement of pressure sensor of membrane vessel feed water stream sensor array 440)
$P_t$=Permeate pressure at time "t" (measurement of pressure sensor of membrane vessel permeate stream sensor array 450)

Figure 12A:
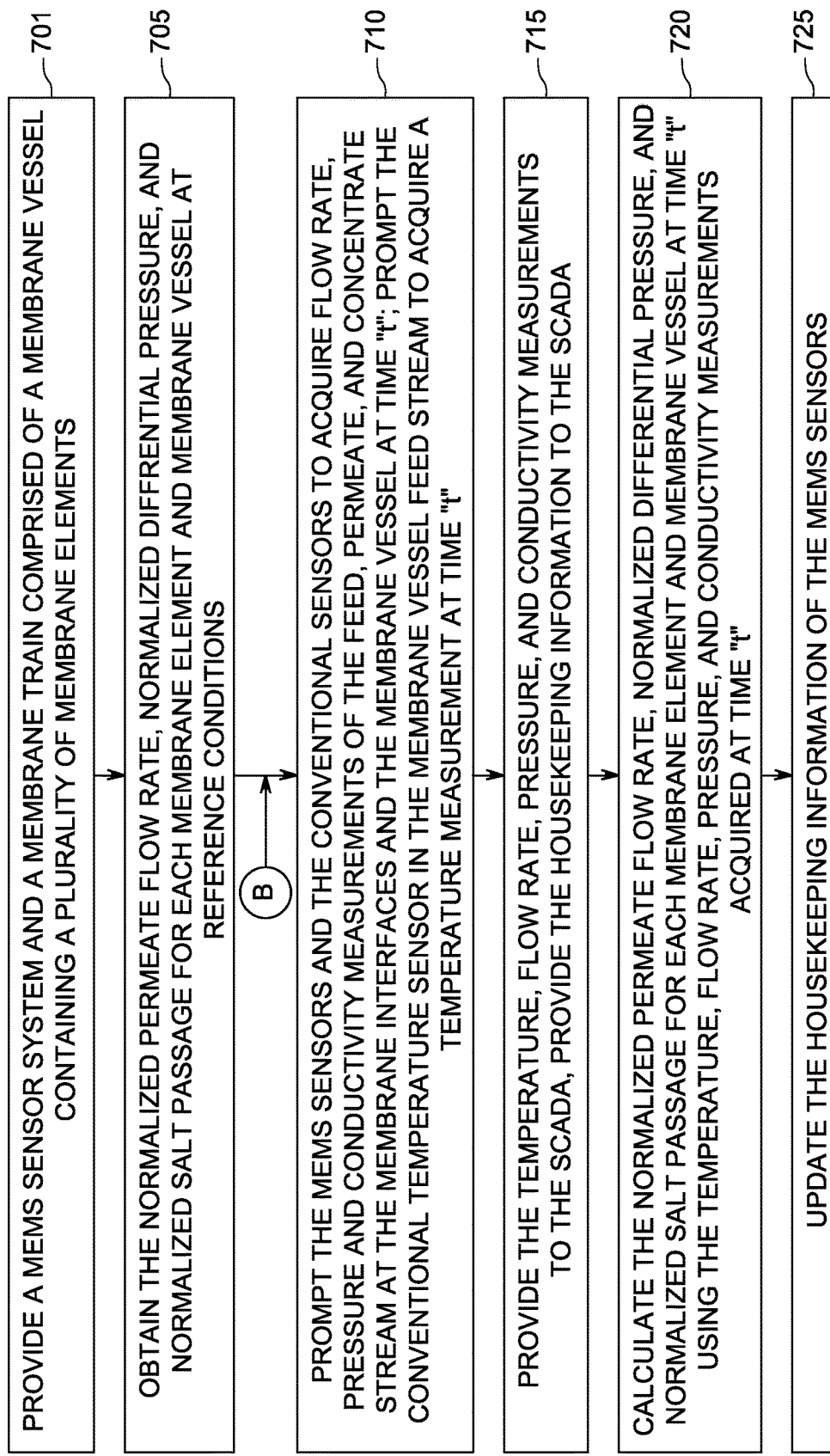
FIGS. 12a-c is a method of operating a MEMS sensor system for a membrane based water filtration plant in accordance with an embodiment of the current invention.
Figure 12B:
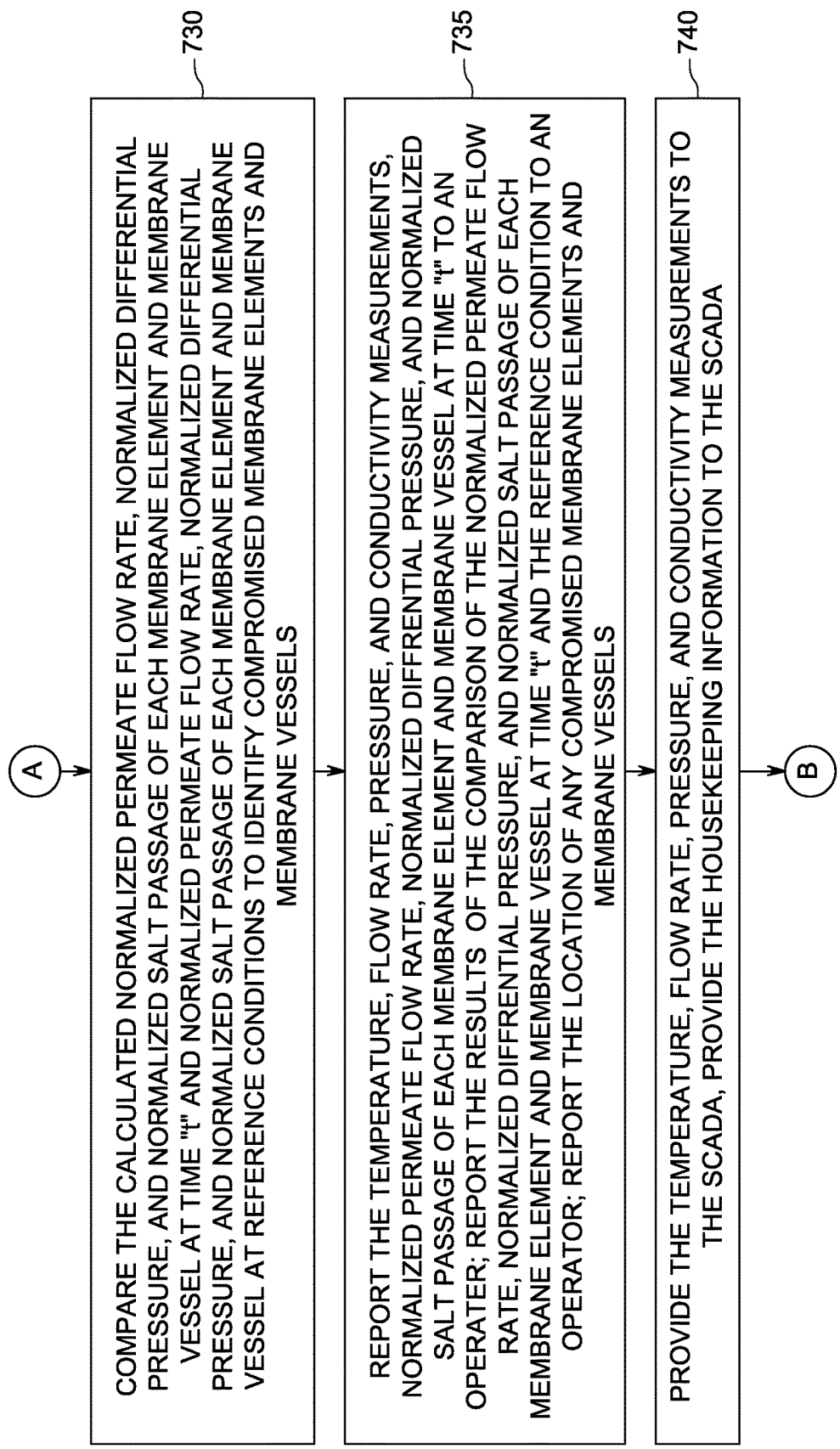
Figure 12C:
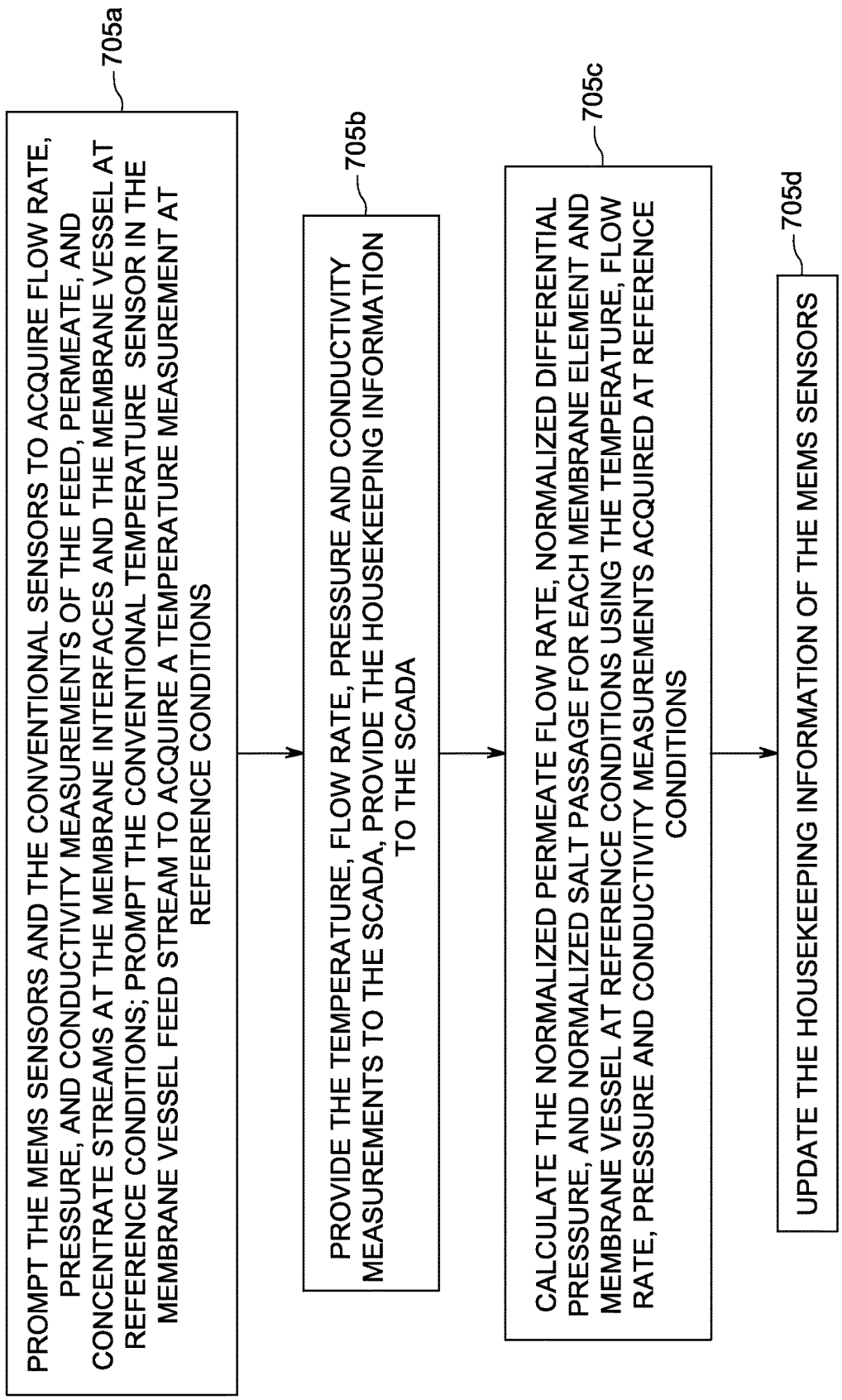

One method of monitoring the performance of membrane elements 410 is shown in FIGS. 12a-c. It is contemplated that in some embodiments, the method of FIGS. 12a-c can also be used to monitor the performance of membrane elements 410 of membrane vessels 435 for blockage or mechanical failure. Further, in another embodiment, it is contemplated that the method shown in FIGS. 12a-c can be used to monitor the performance of membrane elements 410 of membrane vessels 435 and the performance of membrane vessels 435 for blockage or mechanical failure. In step 701, a MEMS sensor system 400 and a membrane train 401 are provided. The membrane train 401 is comprised of one or more membrane vessels 435, with each membrane vessel 435 containing a plurality of membrane elements 410 arranged in series creating membrane interfaces 415 between each membrane element 410. Each membrane element 410 is provided with a feed stream and produces a concentrate stream and a permeate stream.

Membrane vessel 435 is provided with a feed stream at membrane vessel entrance 436 and produces a concentrate stream and a permeate steam at the membrane vessel exit 437. Membrane vessel 435 has a conventional pressure sensor, conventional flow sensor, and a conventional conductivity sensor in each of the feed, concentrate, and permeate streams in the form of a membrane vessel feed stream sensor array 440, membrane vessel concentrate stream sensor array 445, and membrane vessel permeate stream sensor array 450. Membrane vessel feed stream sensor array 440 also has a temperature sensor for measuring the temperature of the fluid in the feed stream. MEMS sensor system 400 is comprised of a plurality of MEMS sensors 10, RTU 402, and SCADA 460. MEMS sensors 10 are located at membrane interfaces 415 and monitor the pressure, flow rate, and conductivity of the feed, permeate, and concentrate streams at each membrane interface 415.

In step 705, the normalized permeate flow rate, normalized differential pressure, and normalized salt passage values are obtained for each membrane element 410 and membrane vessel 435 at reference conditions. Reference conditions is defined as a point in time prior to time "t" when membrane vessels 435 and membrane elements 410 are unfouled and mechanically sound (e.g. o-rings and membranes are intact), such as right after the membrane vessels 435 and membrane elements 410 have been cleaned or initially put into service. The underlying details of step 705 are discussed below and shown in steps 705a-d of FIG. 12c.

In step 710, MEMS sensors 10 and membrane vessel feed stream sensor array 440, membrane vessel concentrate stream sensor array 445, and membrane vessel permeate stream sensor array 450 are prompted to acquire pressure, flow rate, and conductivity measurement values of the feed, permeate, and concentrate streams at membrane interfaces 415 and the membrane vessel entrance 436 and exit 437. Further, membrane vessel feed stream sensor array 440 is prompted to also acquire a temperature value for the fluid of the feed stream at membrane vessel entrance 436. The conductivity measurement values include measurements of individual analyte concentrations and a total analyte concentration measurement (i.e. total conductivity). MEMS sensors 10 are prompted by RTU 402. The time at which the measurements of step 710 are taken is considered time "t".

In step 715, pressure, flow rate, and conductivity measurement values of the feed, permeate, and concentrate streams at membrane interfaces 415 from MEMS sensors 10 are obtained and provided to SCADA 460. Housekeeping information is also obtained from MEMS sensors 10. Pressure, flow rate and conductivity measurement values of the feed, permeate, and concentrate streams at the membrane vessel entrance 436 and exit 437 are also obtained and provided to SCADA 460 by conventional flow, pressure and conductivity sensors in membrane vessel feed stream sensor array 440, membrane vessel concentrate stream sensor array 445, and membrane vessel permeate stream sensor array 450. Further, the temperature measurement values of the fluid in the feed stream at membrane vessel entrance 436 is also obtained and provided to SCADA 460 by a temperature sensor in membrane vessel feed stream sensor array 440.

In step 720, SCADA 460 uses the pressure, flow rate, temperature, and conductivity measurement values taken at time "t" to calculate the normalized permeate flow rate, normalized differential pressure, and normalized salt passage values for each membrane element 410. Further, the normalized permeate flow rate, normalized differential pressure, and normalized salt passage values are also calculated for each membrane vessel 435 in some embodiments.

In step 725, the housekeeping information in MEMS sensors 10 is updated. In step 730, the normalized permeate flow rate, normalized differential pressure, and normalized salt passage values of each membrane element 410 at the reference conditions and at time "t" are compared to identify compromised membrane elements 410. The comparison is made on a membrane element 410 by membrane element 410 basis and also a membrane vessel 435 by membrane vessel 435 basis. Accordingly, an individual normalized permeate flow rate, normalized differential pressure, and normalized salt passage value is obtained for each membrane element 410 at the reference conditions and an individual normalized permeate flow rate, normalized differential pressure, and normalized salt passage value is calculated for each membrane element 410 at time "t". The individual values for normalized permeate flow rate, normalized differential pressure, and normalized salt passage at reference conditions and at time "t" are compared on a membrane element 410 by membrane element 410 basis.

In some embodiments, the normalized permeate flow rate, normalized differential pressure, and normalized salt passage values of each membrane vessel 435 at the reference conditions and at time "t" are also compared to identify compromised membrane vessels 435. The comparison is made on a membrane vessel 435 by membrane vessel 435 basis. Accordingly, an individual normalized permeate flow rate, normalized differential pressure, and normalized salt passage value is obtained for each membrane vessel 435 at the reference conditions, and an individual normalized permeate flow rate, normalized differential pressure, and normalized salt passage value is calculated for each membrane vessel 435 at time "t". The individual values for normalized permeate flow rate, normalized differential pressure, and normalized salt passage at reference conditions and at time "t" are compared on a membrane vessel 435 by membrane vessel 435 basis.

In one embodiment, a membrane element 410 is identified as compromised if the calculated normalized permeate flow value of the membrane element 410 at time "t" is at least about 5% less than the normalized permeate flow value of the membrane element 410 at reference conditions. Further, a membrane element 410 is identified as compromised if the calculated normalized differential pressure value of the membrane element 410 is at least about 5% greater than the normalized pressure differential value of the membrane element 410 at reference conditions. Additionally, membrane element 410 is identified as compromised when the calculated normalized salt passage value of membrane element 410 is at least about 5% greater than the normalized salt passage value of membrane element 410 at reference conditions. Additionally, membrane vessel 435 is identified as compromised if the calculated normalized permeate flow value of membrane vessel 435 is at least about 5% less than the normalized permeate flow value of membrane vessel 435 at reference conditions. Further, membrane vessel 435 is identified as compromised when the calculated normalized differential pressure value of membrane vessel 435 is at least about 5% greater than the normalized pressure differential value of membrane vessel 435 at reference conditions. Further, membrane vessel 435 is identified as compromised when the calculated normalized salt passage value of membrane vessel 435 is at least about 5% greater than the normalized salt passage value of membrane vessel 435 at reference conditions.

In another embodiment, a membrane element 410 is identified as compromised if the calculated normalized permeate flow value of membrane element 410 at time "t" is at least about 10% less than the normalized permeate flow value of the membrane element 410 at reference conditions. Further, a membrane element 410 is identified as compromised if the calculated normalized differential pressure value of membrane element 410 is at least about 10% greater than the normalized pressure differential value of membrane element 410 at reference conditions. Additionally, membrane element 410 is identified as compromised when the calculated normalized salt passage value of membrane element 410 is at least about 10% greater than the normalized salt passage value of membrane element 410 at reference conditions. Additionally, membrane vessel 435 is identified as compromised if the calculated normalized permeate flow value of membrane vessel 435 is at least about 10% less than the normalized permeate flow value of membrane vessel 435 at reference conditions. Further, membrane vessel 435 is identified as compromised when the calculated normalized differential pressure value of membrane vessel 435 is at least about 10% greater than the normalized pressure differential value of membrane vessel 435 at reference conditions. Further, membrane vessel 435 is identified as compromised when the calculated normalized salt passage value of membrane vessel 435 is at least about 10% greater than the normalized salt passage value of membrane vessel 435 at reference conditions.

In yet another embodiment, a membrane element 410 is identified as compromised if the calculated normalized permeate flow value of membrane element 410 at time "t" is at least about 15% less than the normalized permeate flow value of the membrane element 410 at reference conditions. Further, a membrane element 410 is identified as compromised if the calculated normalized differential pressure value of membrane element 410 is at least about 15% greater than the normalized pressure differential value of membrane element 410 at reference conditions. Additionally, membrane element 410 is identified as compromised when the calculated normalized salt passage value of membrane element 410 is at least about 15% greater than the normalized salt passage value of membrane element 410 at reference conditions. Additionally, membrane vessel 435 is identified as compromised if the calculated normalized permeate flow value of membrane vessel 435 is at least about 10% less than the normalized permeate flow value of membrane vessel 435 at reference conditions. Further, membrane vessel 435 is identified as compromised when the calculated normalized differential pressure value of membrane vessel 435 is at least about 15% greater than the normalized pressure differential value of membrane vessel 435 at reference conditions. Further, membrane vessel 435 is identified as compromised when the calculated normalized salt passage value of membrane vessel 435 is at least about 15% greater than the normalized salt passage value of membrane vessel 435 at reference conditions.

In step 735, the locations of compromised membrane elements 410 are reported to an operator. Further, the flow rate, pressure, temperature, and conductivity measurements for membranes 410 at time "t" and at reference conditions are made available to the operator by SCADA 460. Additionally, the normalized permeate flow rate, normalized differential pressure, and normalized salt passage values of each membrane element 410 at time "t" and at reference conditions are made available to the operator by SCADA 460.

Further, in embodiments where the performance of membrane vessels 435 is monitored, the locations of compromised membrane vessels 435 are reported to an operator. Additionally, the flow rate, pressure, temperature, and conductivity measurement values for membrane vessels 435 at time "t" and at reference conditions are made available to the operator by SCADA 460. Further, the normalized permeate flow rate, normalized differential pressure, and normalized salt passage values of each membrane vessel 435 at time "t" and at reference conditions are made available to the operator by SCADA 460. A membrane element 410 or membrane vessel 435 is compromised when it is blocked or partially blocked by fouling, or suffers a mechanical failure.

In step 740, the method pauses for a predetermined time interval before returning to step 710 and obtaining a new set of measurements at a new time "t". This is due to the fact that while the membrane based water purification plant is operating, membrane elements 410 and membrane vessels 435 generally become fouled and mechanical failures generally develop at a slow rate. In one embodiment, the predetermined time interval is between about 15 minutes and 1 month. In another embodiment, the predetermined time interval is between about 1 hour and 1 week. In a further embodiment, the predetermined time interval is 1 day.

Turning to steps 705a-d in FIG. 12c, In step 705a, MEMS sensors 10 and membrane vessel feed stream sensor array 440, membrane vessel concentrate stream sensor array 445, and membrane vessel permeate stream sensor array 450 are prompted to acquire pressure, flow rate, and conductivity measurement values of the feed, permeate, and concentrate streams at membrane interfaces 415 and the membrane vessel entrance 436 and exit 437. Further, membrane vessel feed stream sensor array 440 is prompted to also acquire a temperature measurement value for the fluid of the feed stream at membrane vessel entrance 436. The conductivity measurement values include measurement values of individual analyte concentrations and total analyte concentration (i.e. total conductivity). MEMS sensors 10 are prompted by RTU 402. The measurements are taken during reference conditions.

In step 705b, pressure, flow rate, and conductivity measurement values of the feed, permeate, and concentrate streams at membrane interfaces 415 from MEMS sensors 10 are obtained and provided to SCADA 460. Housekeeping information is also obtained from MEMS sensors 10. Pressure, flow rate and conductivity measurement values of the feed, permeate, and concentrate streams at the membrane vessel entrance 436 and exit 437 are also obtained and provided to SCADA 460 by conventional flow, pressure and conductivity sensors in membrane vessel feed stream sensor array 440, membrane vessel concentrate stream sensor array 445, and membrane vessel permeate stream sensor array 450. Further, the temperature measurement value of the fluid in the feed stream at membrane vessel entrance 436 is also obtained and provided to SCADA 460 by a temperature sensor in membrane vessel feed stream sensor array 440.

In step 705c, SCADA 460 uses the pressure, flow rate, temperature, and conductivity measurement values taken at time "t" to calculate the normalized permeate flow rate, normalized differential pressure, and normalized salt passage values for each membrane element 410. Further, the normalized permeate flow rate, normalized differential pressure, and normalized salt passage values are also calculated for each membrane vessel 435 in some embodiments. In step 705d, the housekeeping information in MEMS sensors 10 is updated.

In one embodiment, MEMS sensors 10 communicate with SCADA 460 through RTU 402. RTU 402 communicates with said MEMS sensors 10 wirelessly. RTU 402 communicates with SCADA 460 through Ethernet. Membrane vessel feed sensor array 440, membrane vessel concentrate stream sensor array 445, and membrane vessel permeate stream sensor array 450, collectively called the conventional sensor arrays, communicate with SCADA 460 wirelessly or though Ethernet.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention. Therefore, the scope of the present invention is defined by the appended claims, and all devices, processes, and methods that come within the meaning of the claims, either literally or by equivalence, are intended to be embraced therein.

What is claimed is:

1. A micro-electromechanical system (MEMS) sensor system for a membrane based water filtration plant comprising:
 a remote telemetry unit (RTU), a supervisory control and data acquisition unit (SCADA), and a plurality of MEMS sensors for measuring pressure, flow rate, and conductivity of a stream;
 said water filtration plant is comprised of a train comprised of a membrane vessel containing a plurality of membrane elements; said membrane vessel and said membrane elements receive a feed stream and produce a concentrate stream and a permeate stream;
 said membrane elements are arranged in series creating an interface between each adjacent membrane element;
 said MEMS sensors measure the flow rate, pressure, and conductivity of said feed stream, concentrate stream, and permeate stream at said interface between each adjacent membrane element;
 said membrane vessel is further comprised of conventional pressure sensors, conventional conductivity sensors, and conventional flow sensors; said conventional pressure sensors are comprised of a conventional pressure sensor in each of said feed stream entering said membrane vessel, and concentrate stream and permeate stream exiting said membrane vessel; said conventional conductivity sensors are comprised of a conventional conductivity sensor in each of said feed stream entering said membrane vessel, and concentrate stream and permeate stream exiting said membrane vessel; said conventional flow sensors are comprised of a conventional flow sensor in each of said feed stream entering said membrane vessel, and concentrate stream and permeate stream exiting said membrane vessel; wherein said membrane vessel is further comprised of a conventional temperature sensor in said feed stream entering said membrane vessel; said conventional pressure sensors measure the pressure of said permeate, concentrate, and feed streams of said membrane vessel; said conventional conductivity sensors measure the conductivity of said permeate, concentrate, and feed streams of said membrane vessel; said conventional flow sensors measure the flow rate of said permeate, concentrate, and feed streams of said membrane vessel; said conventional temperature sensor measures the temperature of said feed stream of said membrane vessel;
 said RTU communicates with said MEMS sensors and said SC.ADA to provide said MEMS sensor pressure and conductivity measurements to said SCADA, said RTU communicates wirelessly with said MEMS sensors;
 said conventional pressure sensors, said conventional conductivity sensors, said conventional flow sensors, and said conventional temperature sensor provide measurements directly to said SCADA;
 wherein said SCADA uses measurements taken by said MEMS sensors, said conventional pressure sensors, said conventional conductivity sensors, said conventional flow sensors, and said conventional temperature sensor to identify if at least one of said membrane elements is compromised,
 wherein each of said MEMS sensors is comprised of a removable smart sensor structure (RSSS) and a control/data transceiver chip (CDTC); said RSSS is comprised of a smart part and at least one of a pressure sensor or a conductivity sensor; wherein said smart part is comprised of a coil, voltage regulator, inductive transceiver, non-volatile memory, microprocessor, and conversion circuitry; wherein said CDTC is comprised of a coil, inductive transceiver, and RF transceiver.

2. The MEMS sensor system of claim 1, wherein said system identifies if at least one of said membrane elements is compromised by
 calculating a normalized permeate flow rate, a normalized differential pressure, and a normalized salt passage for said at least one of said membrane elements using measurements taken by said MEMS sensors, said conventional pressure sensors, said conventional conductivity sensors, said conventional flow sensors, and said conventional temperature sensor,
 and comparing said calculated normalized permeate flow rate, said calculated normalized differential pressure, and said calculated normalized salt passage for said at least one of said membrane elements to a reference normalized permeate flow rate, a reference normalized differential pressure, and a reference normalized salt passage for each membrane element.

3. The MEMS sensor system of claim 2, wherein said at least one of said membrane elements is identified as compromised when said calculated normalized permeate flow rate of said at least one of said membrane elements is at least 5% less than said reference normalized permeate now rate of said at least one of said membrane elements; wherein said at least one of said membrane elements is identified as compromised when said calculated normalized differential pressure of said at least one of said membrane elements is at least 5% greater than said reference normalized differential pressure of said at least one of said membrane elements; wherein said at least one of said membrane elements is identified as compromised when said calculated normalized salt passage of said at least one of said membrane elements is at least 5% greater than said reference normalized salt passage of said at least one of said membrane elements.

4. The MEMS sensor system of claim 1, wherein said system identifies if said membrane vessel is compromised by
calculating a normalized permeate flow rate, a normalized differential pressure, and a normalized salt passage for said membrane vessel using measurements taken by said conventional pressure sensors, said conventional conductivity sensors, said conventional flow sensors, and said conventional temperature sensor,
and comparing said calculated normalized permeate low rate, said calculated normalized differential pressure, and said calculated normalized salt passage for said membrane vessel to a reference normalized permeate flow rate, a reference normalized differential pressure, and a reference normalized salt passage for said membrane vessel.

5. The MEMS sensor system of claim 4, said membrane vessel is identified as compromised when said calculated normalized permeate flow rate of said membrane vessel is at least 5% less than said reference normalized permeate flow rate of said membrane vessel; wherein said membrane vessel is identified as compromised when said calculated normalized differential pressure of said membrane vessel is at bast 5% greater than said reference normalized differential pressure of said membrane vessel; wherein said membrane vessel is identified as compromised when said calculated normalized salt passage of said membrane vessel is at least 5% greater than said reference normalized salt passage of said membrane vessel.

6. The MEMS sensor system of claim 1, wherein each of said MEMS sensors is comprised of at least one of a flow sensor, a pressure sensor, or a conductivity sensor.

7. The MEMS sensors of claim 1, wherein each of said MEMS sensor is powered by a battery in said CDTC, or wirelessly by said RTU.

8. The MEMS sensor of claim 1, wherein each of said MEMS sensors employs one or both of smart power or smart monitoring.

9. The MEMS sensor of claim 1, wherein each of said MEMS sensors contain housekeeping information.

10. The MEMS sensor of claim 1, wherein each of said MEMS sensors are mounted to an anti-telescoping device (ATD) of said membrane elements, wherein said MEMS sensors are mounted in a press-fit slot or a fastener slot of said ATD.

11. A method of operating a micro-electromechanical system (MEMS) sensor system for a membrane based water filtration plant comprising:
providing said MEMS sensor system and a membrane train, said membrane train is comprised of a membrane vessel containing a plurality of membrane elements, said membrane elements are arranged in series to create an interface between each adjacent membrane element; said MEMS sensor system is comprised of a plurality of MEMS sensors and a supervisory control and data acquisition unit (SCADA);
providing said membrane vessel with a feed stream, wherein said membrane vessel produces a concentrate stream and a permeate stream; said membrane vessel is further comprised of a conventional flow sensor, a conventional pressure sensor and a conventional conductivity sensor in each of said feed stream entering said membrane vessel, and concentrate stream and permeate stream exiting said membrane vessel; wherein said membrane vessel is further comprised of a conventional temperature sensor in said feed stream entering said membrane vessel;
providing each of said membrane elements with said feed stream, wherein each of said membrane elements produce said concentrate stream and said permeate stream; said MEMS sensors are placed in said feed stream, concentrate stream, and permeate stream at said interface between each adjacent membrane element;
obtaining a reference normalized permeate flow rate, a reference normalized differential pressure, and a reference normalized salt passage for each of said membrane elements and membrane vessel;
prompting said MEMS sensors and said conventional flow sensor, said conventional pressure sensor, and said conventional conductivity sensor to acquire flow rate, pressure, and conductivity measurements, and prompting said conventional temperature sensor to acquire the temperature of said feed scream at time "t";
providing said flow rate, pressure, and conductivity measurements of said feed, permeate, and concentrate streams at said interface between each adjacent membrane element and said membrane vessel acquired at time "t" to said SCADA; providing said temperature of said feed stream of said membrane vessel acquired at time "t" to said SCADA;
calculating a normalized permeate flow rate, a normalized differential pressure, and a normalized salt passage for each membrane element and membrane vessel, using said temperature, flow rate, pressure and conductivity measurements acquired at time "t"; and
comparing said calculated normalized permeate flow rate, said calculated normalized differential pressure, and said calculated normalized salt passage of each membrane element and membrane vessel to said reference normalized permeate flow rate, said reference normalized differential pressure, and said reference normalized salt passage of each membrane element and membrane vessel to identify if at least one of said membrane elements is compromised and if said membrane vessel is compromised.

12. The method of claim 11 further comprising retrieving housekeeping information from said MEMS sensors and updating said housekeeping information.

13. The method of claim 12, wherein said at least one of said membrane elements is identified as compromised when said calculated normalized permeate flow rate of said at least one of said membrane elements is at least 5% less than said reference normalized permeate flow rate of said at least one of said membrane elements; wherein said at least one of said membrane elements is identified as compromised when said calculated normalized differential pressure of said at least one of said membrane elements is at least 5% greater than said reference normalized pressure differential pressure of said at least one of said membrane elements; wherein said at least one of said membrane elements is identified as compromised when said calculated normalized salt passage of said at least one of said membrane elements is at least 5% greater than said reference normalized salt passage of said at least one of said membrane elements; wherein said membrane vessel is identified as compromised when said calculated normalized permeate flow rate of said membrane vessel is at least 5% less than said reference normalized permeate flow rate of said membrane vessel; wherein said membrane vessel is identified as compromised when said calculated normalized differential pressure of said membrane vessel is at least 5% greater than said reference normalized pressure differential of said membrane vessel; wherein said membrane vessel is identified as compromised when said calculated normalized salt passage of said membrane vessel is at least 5% greater than said reference normalized salt passage of said membrane vessel.

14. The method of claim 11 further comprising reporting to a user said normalized permeate flow rate, said normalized differential pressure, and said normalized salt passage of each membrane element and membrane vessel, said reference normalized permeate flow rate, said reference normalized differential pressure, and said reference normalized salt passage of each membrane element and membrane vessel, and a location of said compromised membrane elements and membrane vessels.

15. The method of claim 11, wherein said conductivity measurements are comprised of measurements of a concentration of individual analytes of interest and a total concentration of all analytes of interest.

16. The method of claim 11, wherein each of said MEMS sensors is comprised of at least one of a flow sensor, a pressure sensor, or a conductivity sensor.

17. The method of claim 11, wherein said MEMS sensor is comprised of a removable smart sensor structure (RSSS) and a control/data transceiver chip (CDTC); said RSSS is comprised of a smart part and at least one of a pressure sensor or a conductivity sensor; wherein said smart part is comprised of a coil, voltage regulator, inductive transceiver, non-volatile memory, microprocessor, and conversion circuitry; wherein said CDTC is comprised of a coil, inductive transceiver, and RF transceiver.

18. The method of claim 11, wherein said MEMS sensor is powered by a battery in said CDTC.

19. The method of claim 11, wherein a remote telemetry unit (RTU) communicates with said MEMS sensors and said SCADA to provide said MEMS sensor pressure and conductivity measurements to said SCADA, wherein said MEMS sensors are powered wirelessly by said RTU.

20. The method of claim 11, wherein said MEMS sensors employ one or both of smart power or smart monitoring.

\* \* \* \* \*

UNITED STATES PATENT AND TRADEMARK OFFICE
CERTIFICATE OF CORRECTION

PATENT NO. : 9,709,429 B2
APPLICATION NO. : 13/724531
DATED : July 18, 2017
INVENTOR(S) : Aveek Chatterjee, Arjun Bhattacharyya and Shankar Chandrasekaran Page 1 of 1

It is certified that error appears in the above-identified patent and that said Letters Patent is hereby corrected as shown below:

In Column 22, Line 11, Claim 1, delete "SC.ADA" and insert -- SCADA --

In Column 22, Line 56, Claim 3, delete "now" and insert -- flow --

In Column 23, Line 10, Claim 4, delete "low" and insert -- flow --

In Column 23, Line 23, Claim 5, delete "bast" and insert -- least --

In Column 24, Line 16, Claim 11, delete "scream" and insert -- stream --

In Column 24, Line 51, Claim 13, delete the first occurrence of "pressure"

In Column 24, Line 65, Claim 13, delete "pressure differential" and insert -- differential pressure --

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*